Figure 1:
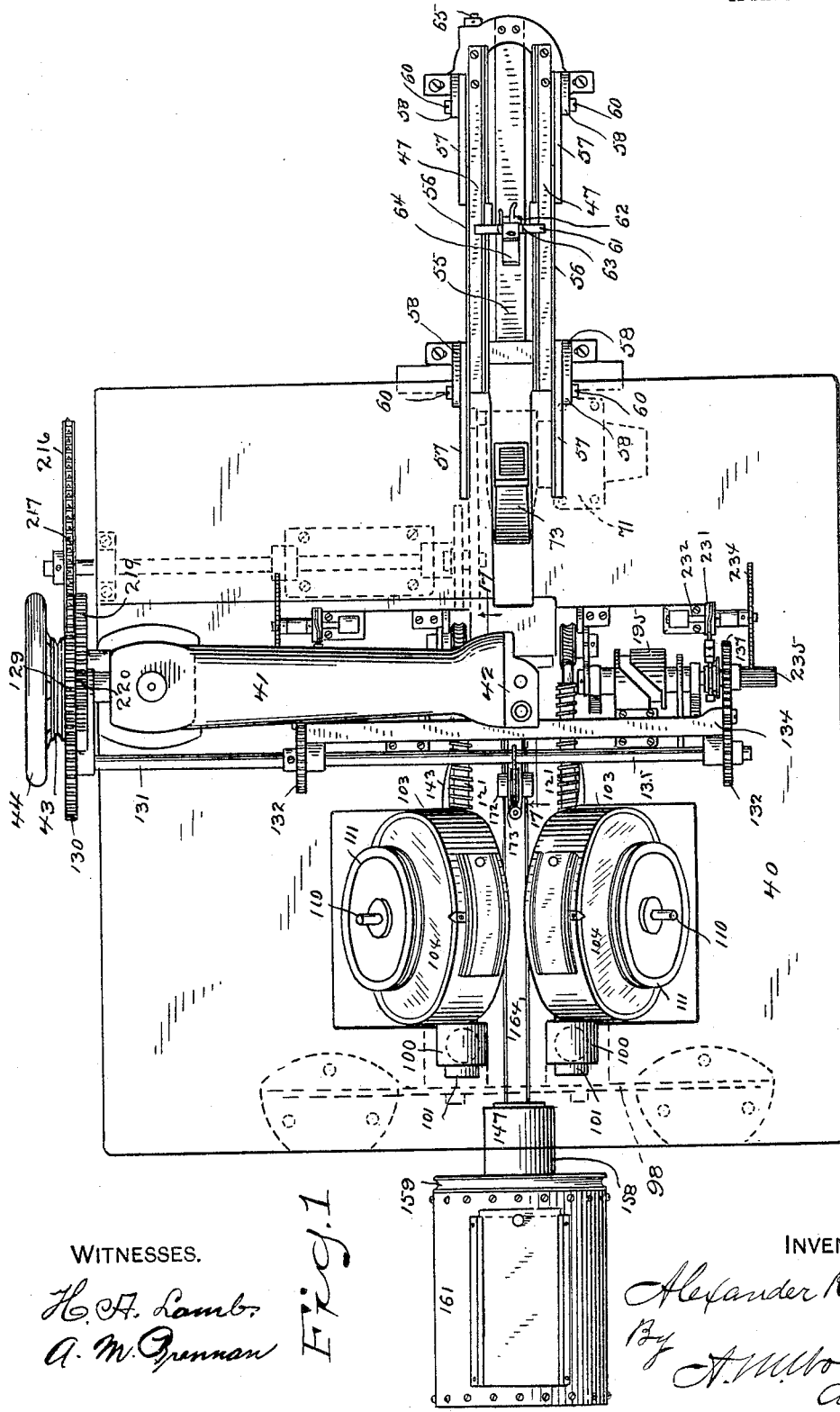

No. 798,212. PATENTED AUG. 29, 1905.
A. RAINERT.
MACHINE FOR SEWING HOOKS AND EYES ON CARDS.
APPLICATION FILED NOV. 25, 1904.

11 SHEETS—SHEET 1.

WITNESSES.
H. A. Lamb.
A. M. Brennan

INVENTOR.
Alexander Rainert
By A. M. Wooster
Atty.

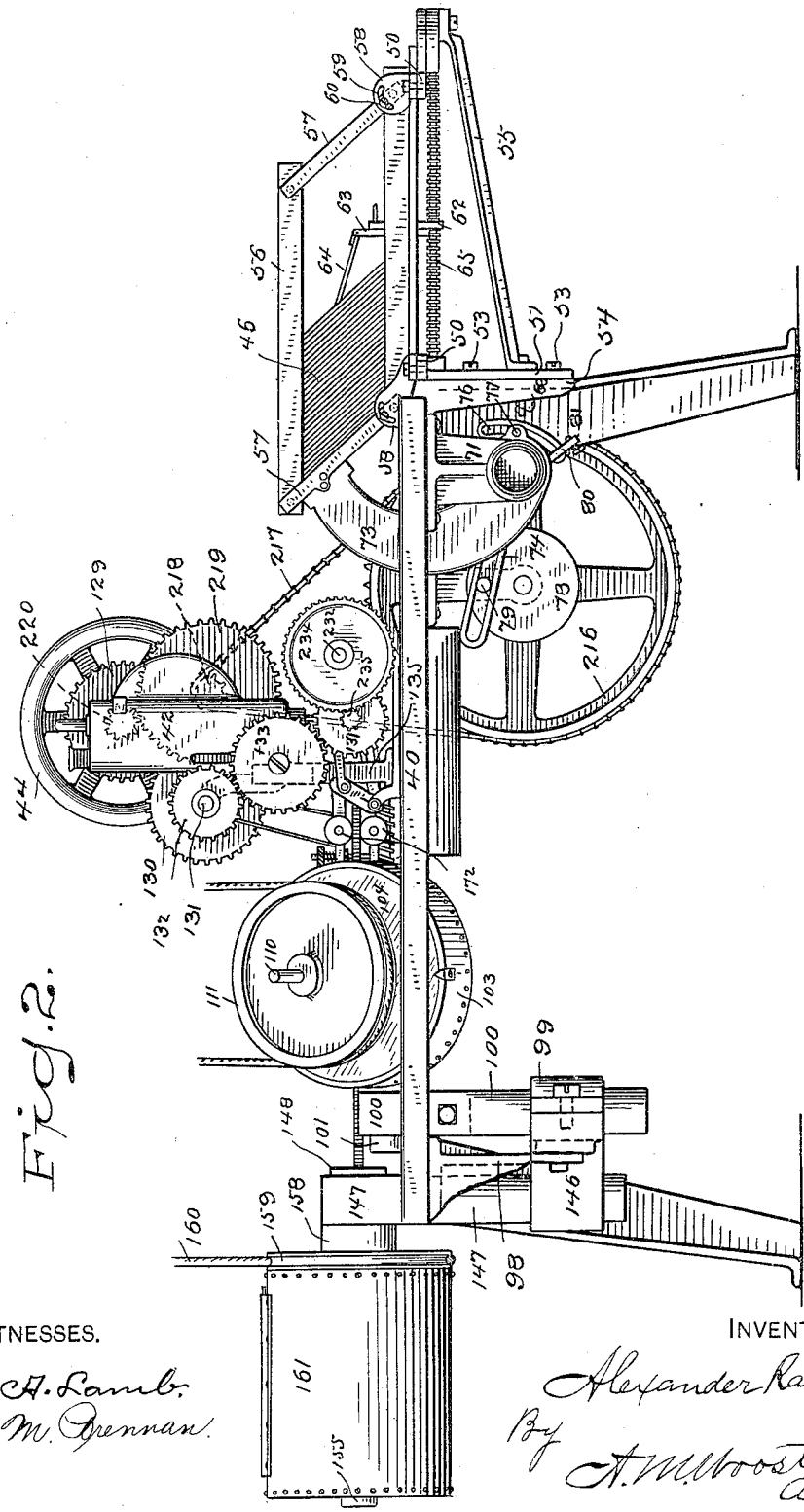

No. 798,212. PATENTED AUG. 29, 1905.
A. RAINERT.
MACHINE FOR SEWING HOOKS AND EYES ON CARDS.
APPLICATION FILED NOV. 25, 1904.
11 SHEETS—SHEET 3.
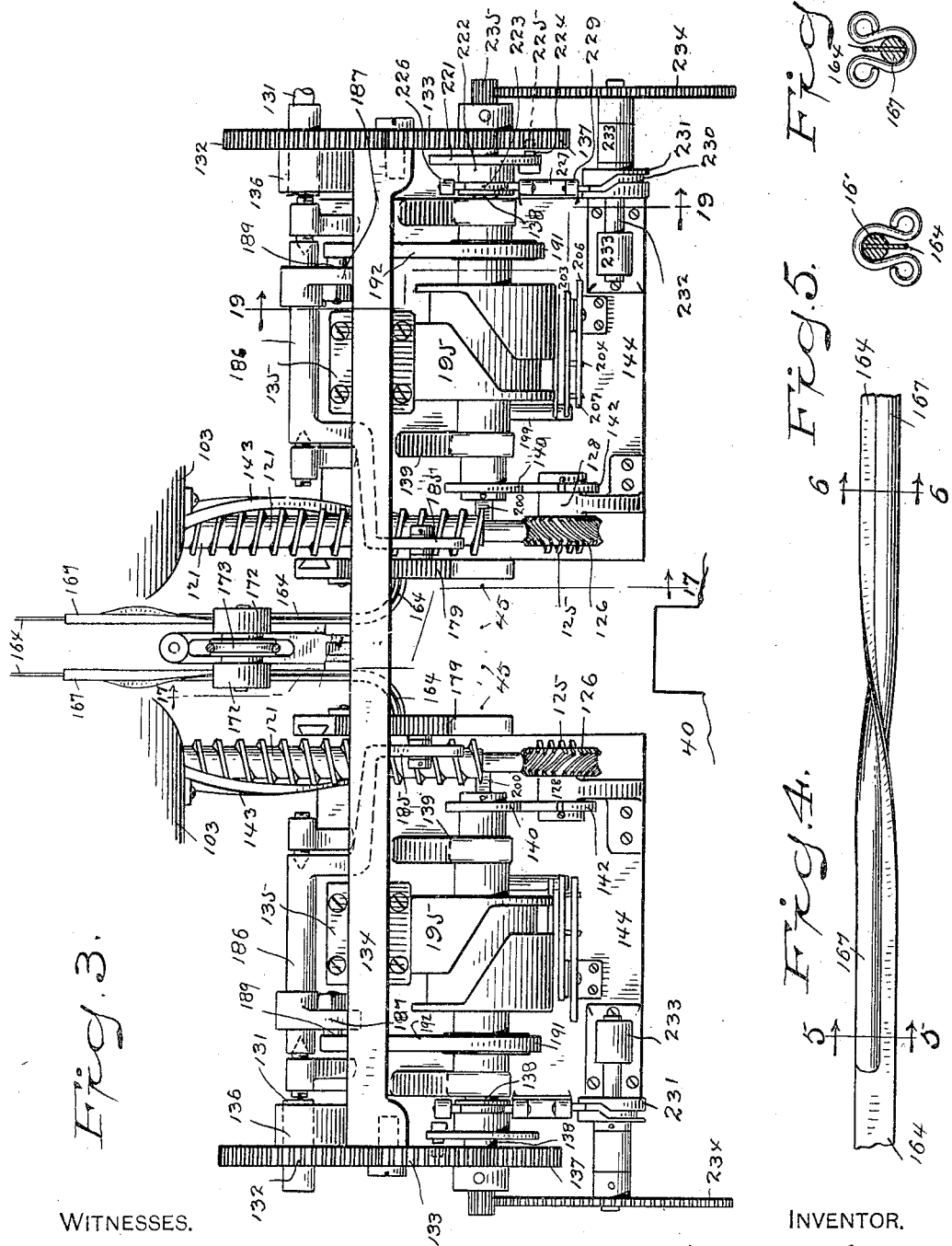
WITNESSES.
H. A. Lamb
G. M. Brennan
INVENTOR.
Alexander Rainert
By
A. M. Wooster
Atty.

No. 798,212. PATENTED AUG. 29, 1905.
A. RAINERT.
MACHINE FOR SEWING HOOKS AND EYES ON CARDS.
APPLICATION FILED NOV. 25, 1904.
11 SHEETS—SHEET 4.
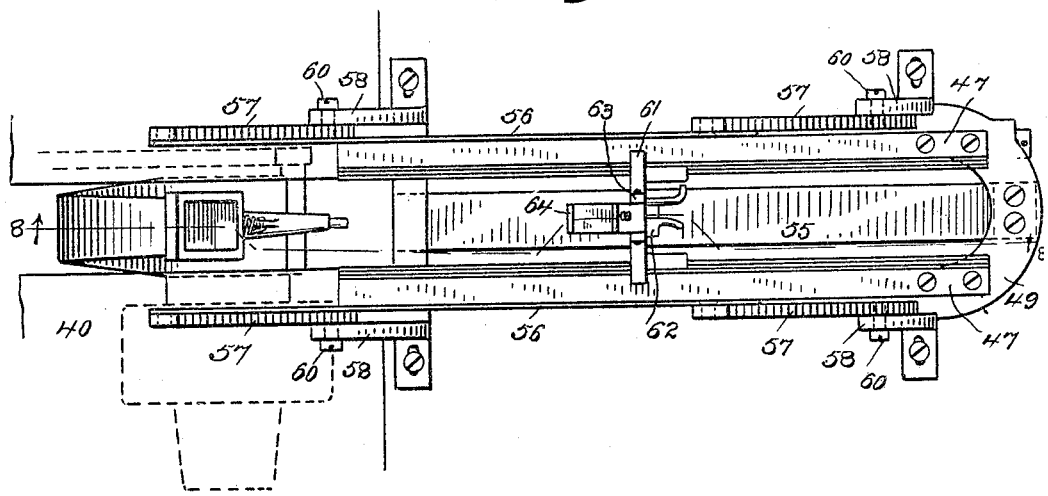
Fig. 7.
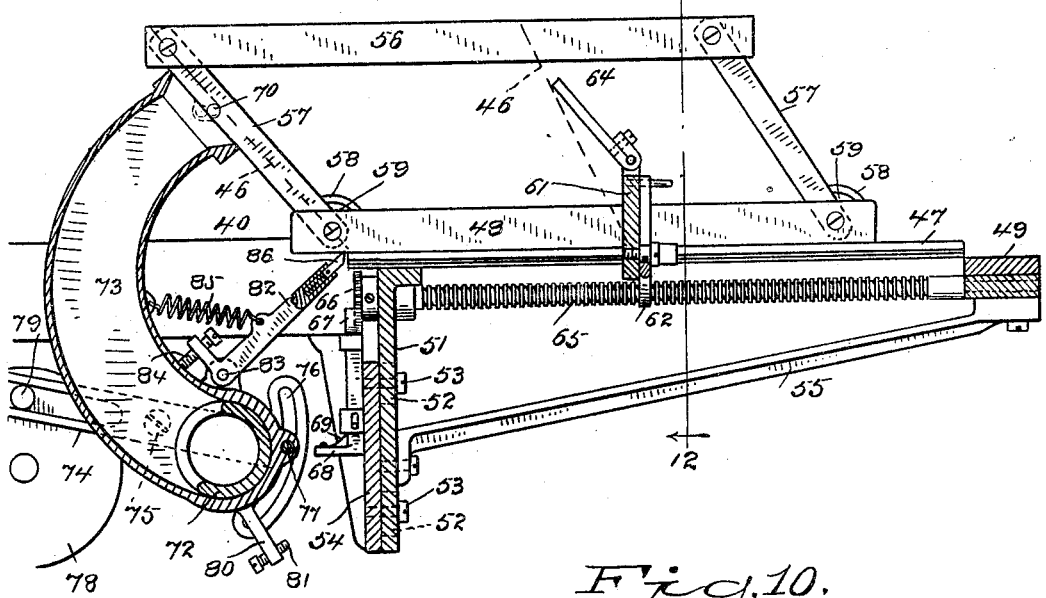
Fig. 8.
Fig. 9.
Fig. 10.
WITNESSES.
INVENTOR.
Alexander Rainert
By A. M. Wooster
Atty.

No. 798,212. PATENTED AUG. 29, 1905.
A. RAINERT.
MACHINE FOR SEWING HOOKS AND EYES ON CARDS.
APPLICATION FILED NOV. 25, 1904.

11 SHEETS—SHEET 5.

WITNESSES.
H. A. Lamb
G. W. Brennan

INVENTOR.
Alexander Rainert
By A. W. Wooster
Atty.

No. 798,212. PATENTED AUG. 29, 1905.
A. RAINERT.
MACHINE FOR SEWING HOOKS AND EYES ON CARDS.
APPLICATION FILED NOV. 25, 1904.
11 SHEETS—SHEET 6.
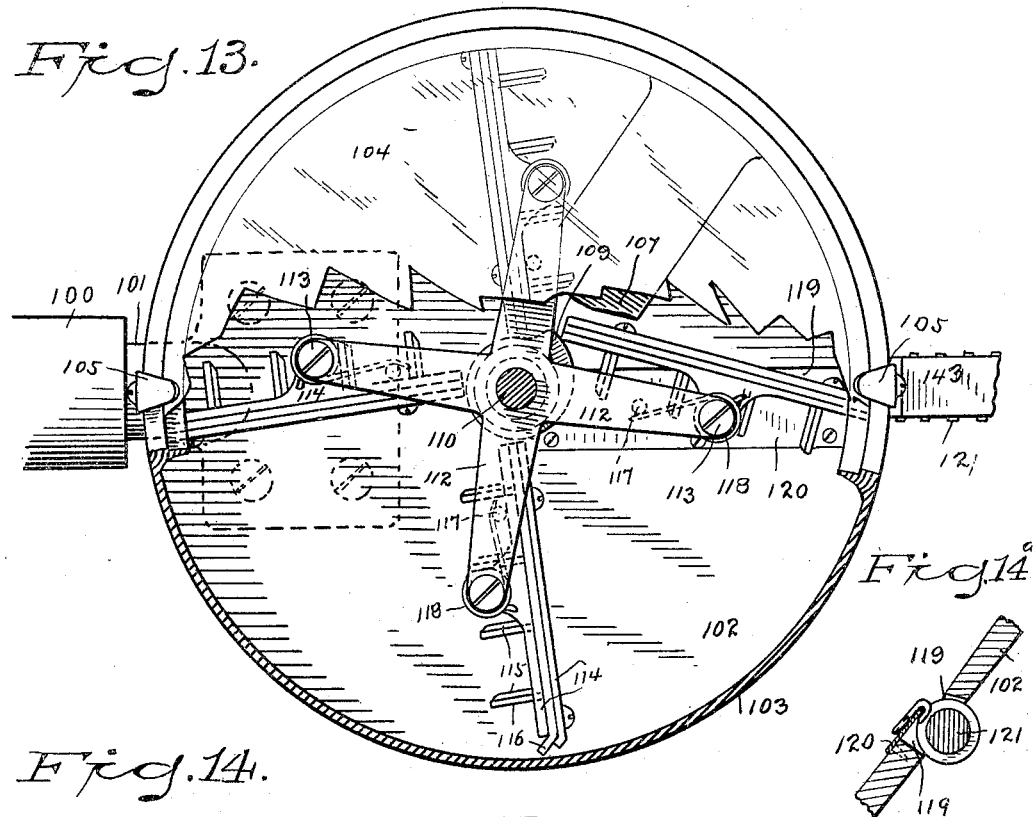
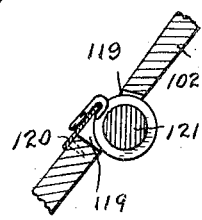
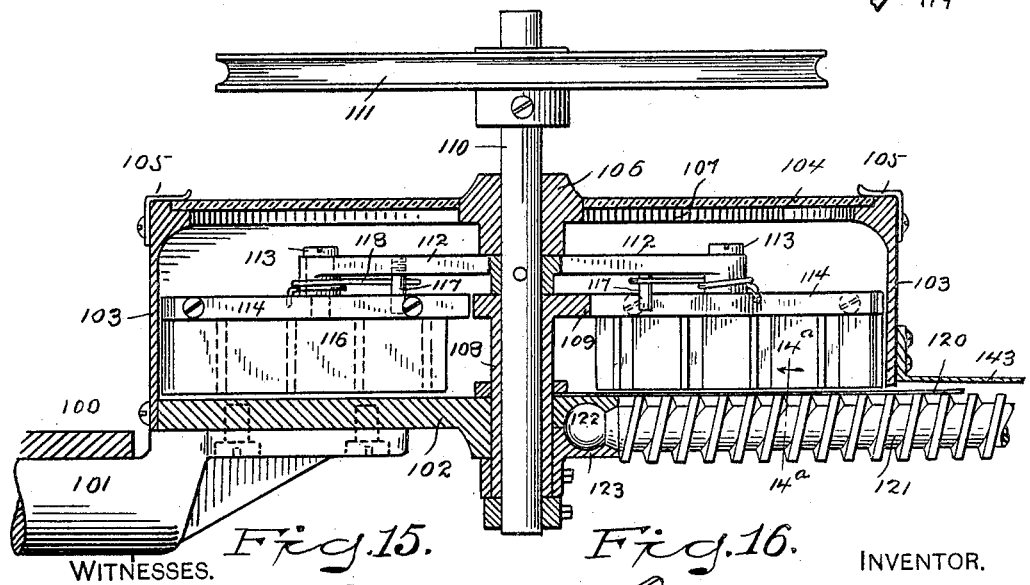
WITNESSES.
H. A. Lamb.
G. M. Brennan.
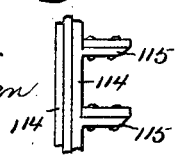
INVENTOR.
Alexander Rainert
By A. W. Wooster
Atty.

No. 798,212. PATENTED AUG. 29, 1905.
A. RAINERT.
MACHINE FOR SEWING HOOKS AND EYES ON CARDS.
APPLICATION FILED NOV. 25, 1904.
11 SHEETS—SHEET 7.
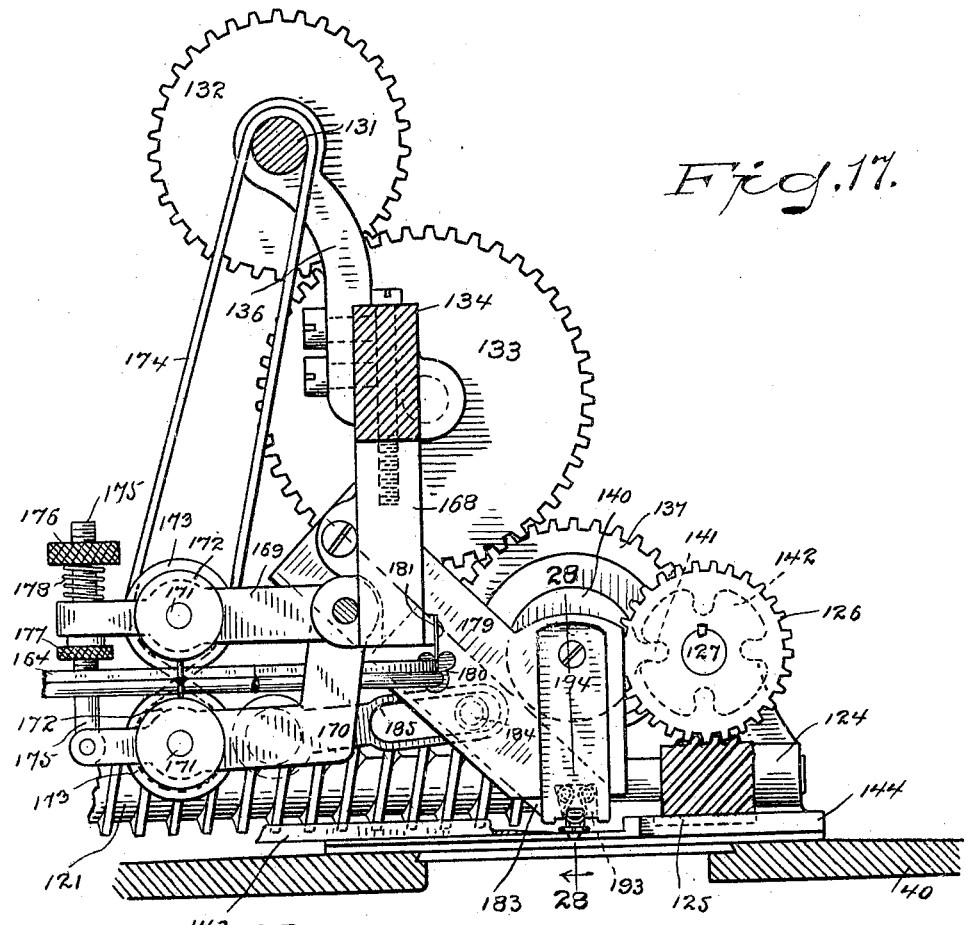
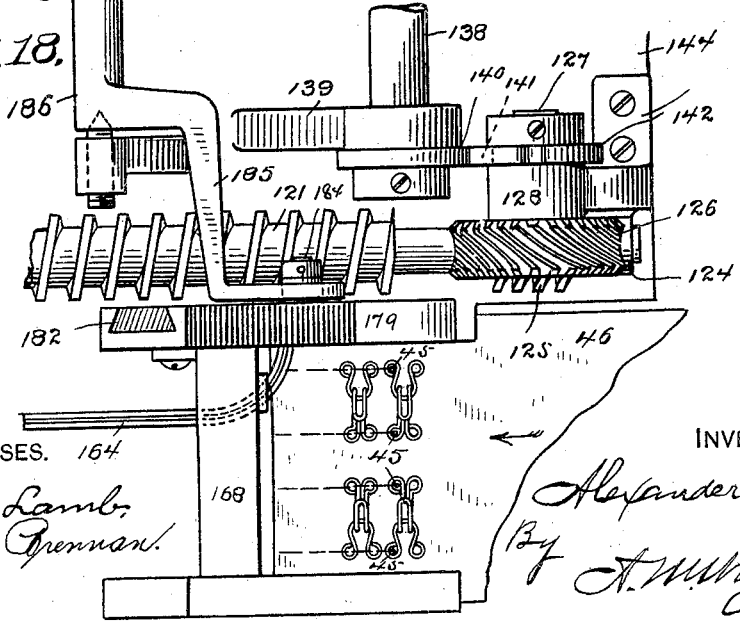
WITNESSES.
H. A. Lamb
G. W. Brennan
INVENTOR.
Alexander Rainert
By A. M. Wooster
Atty.

No. 798,212. PATENTED AUG. 29, 1905.
A. RAINERT.
MACHINE FOR SEWING HOOKS AND EYES ON CARDS.
APPLICATION FILED NOV. 25, 1904.

11 SHEETS—SHEET 8.

WITNESSES.
H. A. Lamb.
A. M. Brennan.

INVENTOR.
Alexander Rainert
By A. M. Wooster
Atty

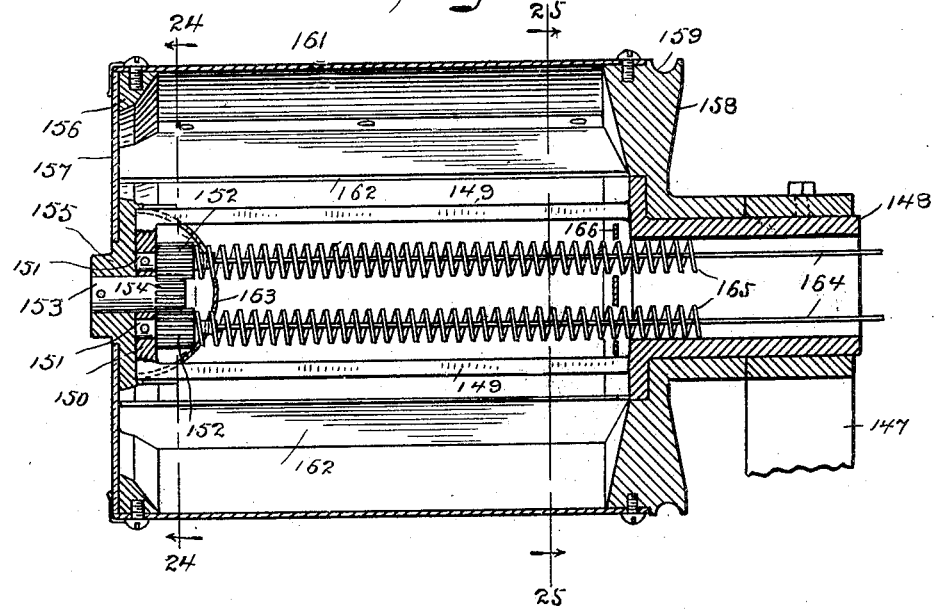
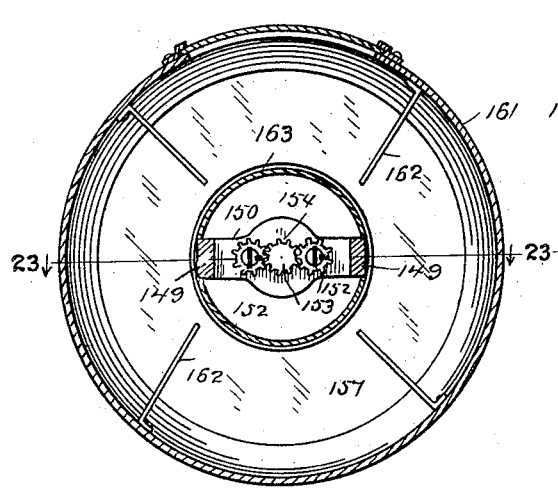
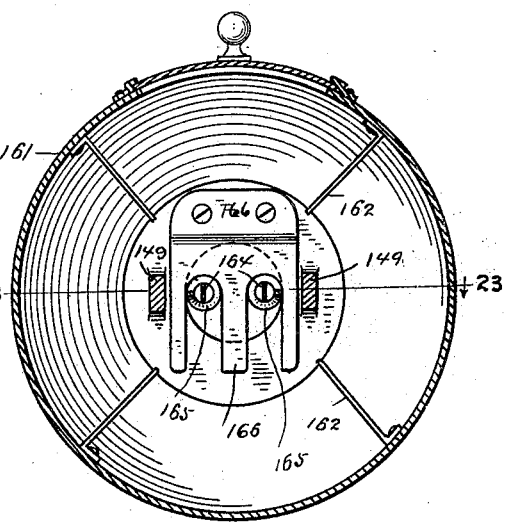
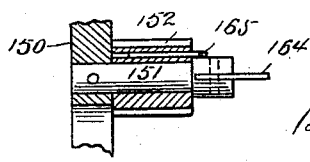

No. 798,212. PATENTED AUG. 29, 1905.
A. RAINERT.
MACHINE FOR SEWING HOOKS AND EYES ON CARDS.
APPLICATION FILED NOV 25, 1904.
11 SHEETS—SHEET 10.
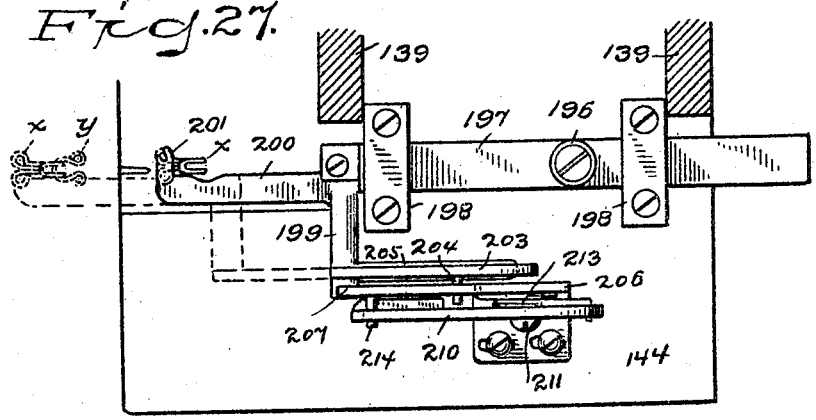
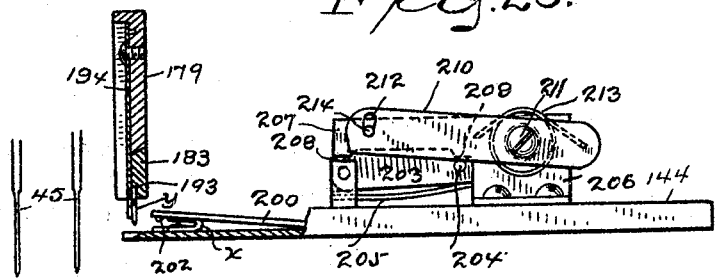
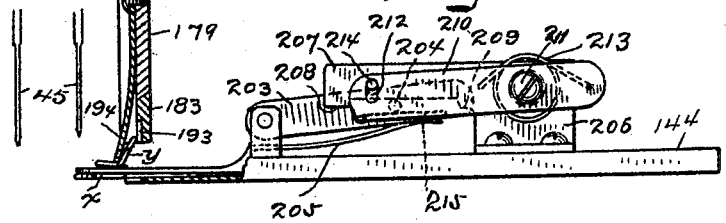
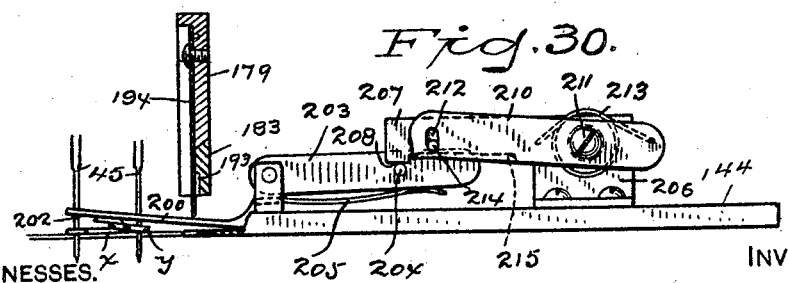
WITNESSES.
H. A. Lamb.
G. M. Brennan.
INVENTOR.
Alexander Rainert
By A. M. Wooster
Atty.

No. 798,212. PATENTED AUG. 29, 1905.
A. RAINERT.
MACHINE FOR SEWING HOOKS AND EYES ON CARDS.
APPLICATION FILED NOV. 25, 1904.

11 SHEETS—SHEET 11.

WITNESSES.
H. A. Lamb
G. M. Brennan

INVENTOR.
Alexander Rainert
By A. M. Wooster
Atty.

UNITED STATES PATENT OFFICE.

ALEXANDER RAINERT, OF WEST ORANGE, NEW JERSEY, ASSIGNOR TO THE STAR PIN COMPANY, OF DERBY, CONNECTICUT, A CORPORATION OF CONNECTICUT.

MACHINE FOR SEWING HOOKS AND EYES ON CARDS.

No. 798,212.      Specification of Letters Patent.      Patented Aug. 29, 1905.

Application filed November 25, 1904. Serial No. 234,213.

*To all whom it may concern:*

Be it known that I, ALEXANDER RAINERT, a citizen of the United States, residing at West Orange, county of Essex, State of New Jersey, have invented a new and useful Machine for Securing Hooks and Eyes on Cards, of which the following is a specification.

This invention relates to machines for securing hooks and eyes to the cards upon which the hooks and eyes are marketed, and has particular reference to that type of such machines in which the hooks and eyes are engaged with each other and then secured to the cards.

The object of my invention is to provide a machine of this character which shall be as simple and as automatic as possible in operation and reliable in all its parts and which will secure the hooks and eyes interengaged in groups containing a predetermined number of the hooks and eyes, means being provided whereby the feed or supply of the hooks and eyes will be automatically stopped when such predetermined number comprising the group, such as a dozen in each row, have been secured to the card.

To these ends the invention consists in the construction and combination of parts substantially as hereinafter described and claimed.

Figure 11:
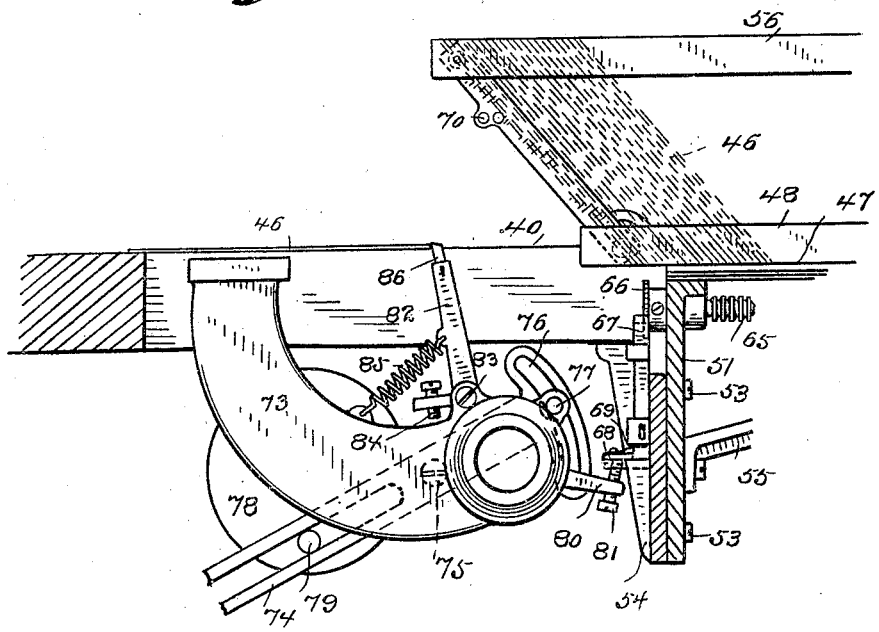
Figure 12:
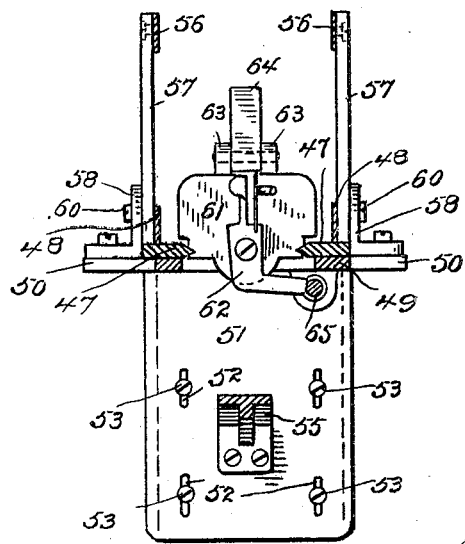
Figure 19:
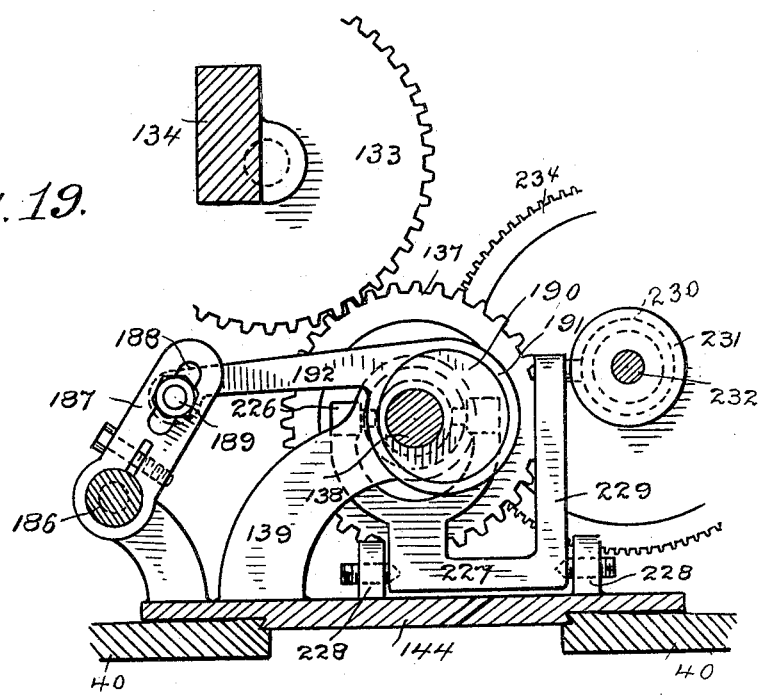
Figure 20:
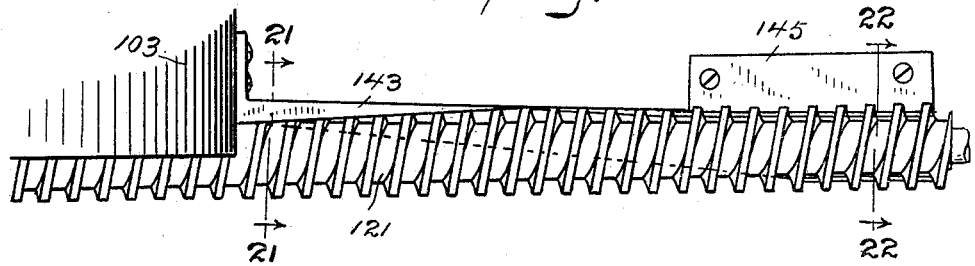
Figure 21:
Figure 22:
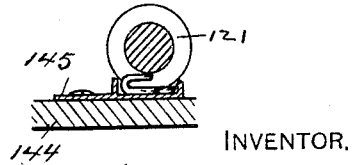
Figure 31:
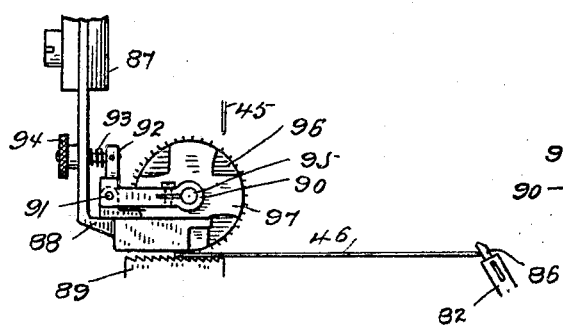
Figure 32:
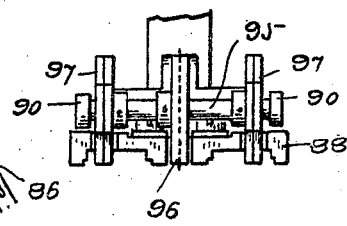
Figure 33:
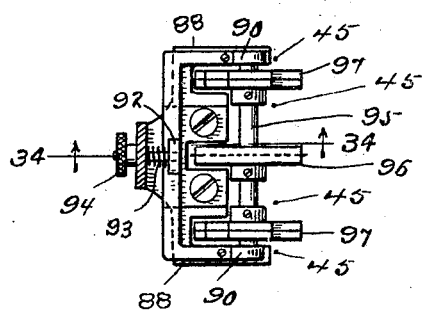
Figure 34:
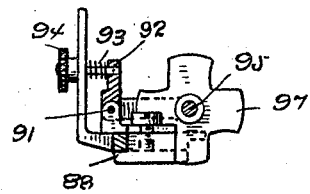

Of the accompanying drawings, Figure 1 is a plan view of a complete machine constructed according to my invention, said figure omitting, however, for the sake of clearness, several minor details of the machine. Fig. 2 represents a front elevation of the same. Fig. 3 represents an enlarged detail of parts of the mechanism located centrally in Fig. 1 and below the sewing-machine arm. Fig. 4 is a detail view of a portion of the guide-strip for the eyes. Fig. 5 represents a section on line 5 5 of Fig. 4. Fig. 6 represents a section on line 6 6 of Fig. 4. Fig. 7 represents an enlarged detail plan of the card-magazine and feed mechanism. Fig. 8 represents a section on line 8 8 of Fig. 7. Fig. 9 is a detail view of the yielding card retaining buttons. Fig. 10 represents a section on line 10 10 of Fig. 9. Fig. 11 is a view similar to Fig. 8, but showing the swinging suction-feed arm or card-picker in elevation and in a different position from that shown in Fig. 8. Fig. 12 represents a section on line 12 12 of Fig. 8 or a view from the right of Fig. 11. Fig. 13 is a detail plan, partly broken away, of the hook-hopper. Fig. 14 represents a cross-section at one side of the center of Fig. 13. Fig. 14$^a$ is a detail section on line 14$^a$ 14$^a$ of Fig. 14. Figs. 15 and 16 are detail plan and perspective views, respectively, of a portion of one of the wings in the hook-hopper. Fig. 17 represents a section on line 17 17 of Figs. 1 and 3. Fig. 18 is a plan view of some of the parts shown in Fig. 17. Fig. 19 is a section on line 19 19 of Fig. 3. Fig. 20 is a detail view of a portion of the feed-worm and chute leading from the hook-hopper. Fig. 21 represents a section on line 21 21 of Fig. 20. Fig. 22 represents a section on line 22 22 of Fig. 20. Fig. 23 is a detail longitudinal section of the hook-hopper on a line such as 23 23 in Figs. 24 and 25. Fig. 24 represents a section on line 24 24 of Fig. 23. Fig. 25 represents a section on line 25 25 of Fig. 23. Fig. 26 is a detail, on a larger scale than Fig. 23, representing a section through one of the pinions which rotates the eye-feed spiral. Fig. 27 is a detail view of some of the mechanism for advancing the hooks to engage the eyes and to then advance the engaged hooks and eyes to position under the needles. Fig. 28 is a detail side elevation and part section on line 28 28 of Fig. 17 and illustrating the mechanism shown in Fig. 27 for delivering the eyes to be engaged by the hooks, said figure also indicating the position or path of movement of the needles relatively to the hook-and-eye delivery devices. Figs. 29 and 30 are views similar to Fig. 28, but showing the parts in different positions. Fig. 31 is a detail side elevation of the presser-foot and means carried thereby for insuring the accurate location of the hooks and eyes when attached to the card by the sewing-machine needles. Fig. 32 is a view looking from the right of Fig. 31. Fig. 33 is a plan view of the parts shown in Fig. 31. Figs. 34, 35, 36, and 37 are detail views, hereinafter referred to, of some of the parts shown in Figs. 31 and 33.

Similar reference characters indicate the same or similar parts throughout the several views.

To facilitate an understanding of the following description of the details of the different parts of the mechanism, I will premise with the following brief explanation: A quantity of suitable cards 46 are stacked in the magazine provided therefor, as shown at the right of Fig. 2. A picker device 73 separates the cards one by one from the end of the magazine, and said cards are then carried between the presser-foot and the feed-dog of a four-needle sewing-machine. At the same time hooks are taken from the hopper 103 and fed by means of a worm-screw 121, and the eyes are fed from the hoppers 161 along two guide-strips 164 and between suitable feed-rolls to devices which cause the bills of the hooks to engage the eyes and carry them to position on the cards in two rows, where the thread-eyes of the hooks and eyes will be engaged by the sewing-thread carried by the needles 45, so as to secure the interengaged hooks and eyes in two rows, Fig. 18 showing portions of such two rows, and although the sewing-machine and the card-feed devices are adapted to operate continuously the devices which engage the bills of the hooks with the eyes and shift them under the path of the needles may be automatically checked in their operation, so that lines of stitches alone will be formed at the ends of the rows of attached hooks and eyes.

The bed or table 40 of the machine is supported upon suitable legs and may be made entirely of metal or partly of metal and partly of wood. Of course the portions of the table which carry the parts of the sewing-machine will be of metal.

41 represents an arm of an ordinary type of sewing-machine having a head 42 and a driving-pulley 43 and a hand-wheel 44.

It is to be understood that the mechanism of the sewing-machine may be of any well-known type, and therefore in the accompanying drawings I do not attempt to disclose the sewing mechanism other than the needles and the feed-dog. Inasmuch as the invention herein illustrated is designed to simultaneously secure to the cards two rows of interengaged hooks and eyes, the sewing-machine has four needles and will of course have the necessary parts to coact therewith to form four rows of stitches. In several of the figures I have represented the needles conventionally at 45.

Referring first to the card-feed mechanism, illustrated particularly in Figs. 1, 2, 7, 8, 9, 10, 11, and 12, it will be seen that the cards 46 are stacked edgewise and preferably inclined in a hopper or magazine. The bottom 47 of the magazine is slotted to permit the movement of the follower longitudinally thereof and has side flanges 48. 49 represents a horizontal portion of the bracket which supports the bottom 47 and is provided with laterally-extending ears 50 and with a vertical portion 51, having vertical slots 52. Screws 53 pass through the slots 52 into the bracket 54, depending from the bed or table 40. A brace 55 serves to support the outer end of the magazine. The upper portions of the sides of the card-magazine are formed by strips 56, connected by pivoted links 57 with angle-brackets 58, which are secured to the ears 50. Curved slots 59 (see Figs. 2, 7, and 8) are formed in the brackets 58, and screws 60 pass through said slots into the links 57. By means of said curved slots and screws the angle or inclination of the cards may be varied owing to the retainer-buttons presently described and which are carried by the front links. The follower for the cards is represented at 61 and is mounted to slide between the beveled edges of the bottom 47. (See Fig. 12.) Pivoted to the follower 61 is a finger-piece 62, having its lower end formed as a toe to engage the feed-screw, presently described, in such a manner that the toe of this finger-piece will act as a portion of a nut to cause the follower to be moved along its ways by the rotation of the feed-screw. Lugs 63 63 at the top of the follower 61 rigidly support a horizontal pin, on which is mounted an adjustable portion 64 of the follower. This adjustable portion may bear by gravity against the rearmost card of the pack, as indicated in Fig. 8; but it may be set and frictionally held on the pin which connects the lugs 63, so that it will bear rigidly against the rearmost card. The feed-screw 65 is suitably mounted in the bracket below the plane of the bottom of the magazine and at one side of the slot thereof. Secured to one end of said feed-screw is a ratchet 66, said ratchet being engaged by a vertically-movable pawl 67, suitably mounted in the guides of the bracket 54. (See Fig. 8.) The lower end of the pawl 67 is formed with a lateral projection or foot 68, a spring 69 being secured to the upper surface of said foot and bearing underneath the lower edge of the lower guide for said pawl. Said foot is adapted to be engaged by the screw 81, hereinafter referred to, in order to lift the pawl and rotate the feed-screw in a direction to advance the follower. Any suitable means may be employed to prevent reverse movement of the feed-screw and its ratchet. Whenever it may be desired to set the follower farther back, the operator will swing the finger-piece 62, so as to disengage the toe thereof from the feed-screw, after which the said toe will be reëngaged with the feed-screw, so that the follower will be advanced. Referring particularly to Figs. 8, 9, and 10, each of the two links 57 at the front end of the magazine is formed with recesses or pockets to receive two spring-pressed buttons 70. The heads of these buttons are rounded and projected sufficiently across the path of movement of the edges of the cards 46 to retain said cards in the positions indicated. The springs that are located behind the heads of the buttons 70 are of such strength as will permit them to yield when the front card of the pack is drawn away by the suction device or pneumatic picker, hereinafter described. The reason for employing two of said buttons is that in case the suction device should draw not only the first card but also the second card past the inner button the second card will be retained by the outer button, (on each front link 57.) On the return movement of the suction device it will first simply press back the outer and partially-detached card against the next one, and then on the downward or detaching movement of the suction device that card will be carried to a horizontal position on the bed or table 40, the edges of the card being supported on each side of the passage-way that is formed in said bed or table for the movement of the suction-feed or card-picker device. Referring to Fig. 2, 71 indicates a bracket depending from the under side of the table 40, said bracket having an air-pipe 72 fixed therein and adapted to have connected with its outer end a suitable air-suction conduit. (Not shown.) Inside of the bracket 71 and on the pipe 72, which is formed with an opening, as shown in Fig. 8, is mounted a swinging suction-arm 73, which I refer to as the "pneumatic card-picker." The inner end of the pipe 72 forms the bearing on which said picker is mounted, so as to turn thereon. Secured to one side of the arm or picker 73, as at 75, is an arm 74, slotted at its outer end. The inner end of said arm 74 is enlarged or formed with branches, in which is formed a curved slot 76. A bolt 77 passes through said slot and through an opening in a portion of a picker 73, as shown in Fig. 8, said bolt being provided with means which may be tightened to secure the parts together at this point. A suitably-driven rotary disk 78 is provided with a crank-pin 79, entering the slot of the arm 74. By this means the suction card-picker will be caused to move between the positions indicated in Figs. 8 and 11, so as to draw away from the magazine and place in a horizontal position the front card of the pack. The object of the formation of the arm 74 with the slot 76 is to enable an adjustment of the card-picker to be effected. By loosening the bolt 77 the picker 73 can be swung on the pipe 72, the pivotal point 75 of the arm 74 moving at the same time. In other words, since the arm 74 is secured to the card-picker 73 at two points, 75 and 77, the latter being adjustable, the operative swing of the card-picker may be altered, so that when in its upper extreme position its mouth will properly contact with the first card of the pack, according to the angle or inclination at which the links 57 have been adjusted. The stud-arm 80, projecting from the picker 73, below the swinging point of the latter, is provided with a screw 81, which contacts with the under side of the foot 68 of the feed-screw pawl, so as to lift the latter and advance the follower, as hereinbefore described. By adjusting the amount of projection of the tip of the screw 81 from the arm 80 the amount of movement imparted to the pawl may be varied. Fig. 11 illustrates the coaction between said screw and pawl-foot. In order to advance each card along the table after it has been detached from the hopper by the card-picker, I provide a pawl 82, pivoted at 83 to a portion of the arm 73, said pawl having a short arm carrying a stop-screw adapted to abut against the surface of said arm 73, as shown in Fig. 8. The spring 85 connects the pawl 82 with the arm 73, the screw 84 serving to adjust the position that the pawl will normally keep. The end of the pawl 82 is provided with a spring-pressed finger or tooth 86, which is adapted to engage the rear edge of a detached card and move it along, as shown in Fig. 11, to an ultimate position (shown in Fig. 31) where the front edge of said card will be engaged by the devices which I shall now describe.

Figure 35:
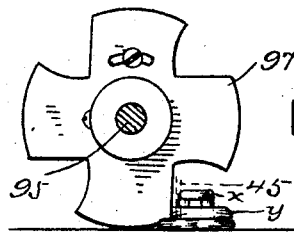
Figure 36:
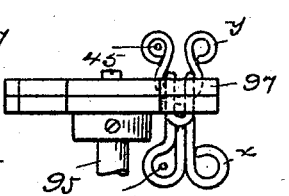
Figure 37:
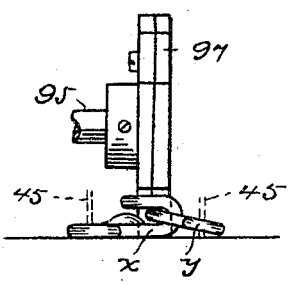

A portion of the presser-foot bar 87 of the sewing-machine is shown in Fig. 31, said bar having a presser-foot 88 formed with slots or recesses in one edge, as shown in Fig. 33. A portion of an ordinary feed-dog 89 is indicated in Fig. 31. A frame 90 is pivoted at 91 to suitable ears rising from the presser-foot, said frame having an arm 92, from which a pin extends through the presser-foot bar, a spring at 93 being mounted on said pin and located between the presser-foot bar and the arm 92. A nut 94, fitting the end of the pin which extends through the presser-foot bar, enables the position to which the frame will be pressed downward by the spring 93 to be adjusted. A shaft 95 is mounted in suitable friction-bearings carried by the frame 90, and secured to said shaft is a toothed wheel 96 and a pair of notched disks 97. As the card is advanced by the feed-dog 89, the engagement of the teeth or pins of the wheel 96 with the card will cause said wheel to be positively rotated and with it the shaft 95 and the disks 97. These disks are for the purpose of insuring the proper location of the joined hooks and eyes, so that the needles of the sewing-machine will properly enter the thread-openings of said hooks and eyes. Each recess or notch of each disk has a wall, such as indicated in Figs. 35 and 37, that will serve as an abutment against which the engaged portions of the hooks and eyes will rest when the needles descend. As the card is advanced by the feed-dog, the wheel 96 and the disks 97 are moved the proper distance to permit of the advance of the hooks and eyes that have been secured to the card. Preferably the disks 97 are each composed of two thicknesses of metal having the same contour, one section having a hub, which is secured to the shaft 95, and the other section being mounted so as to be capable of a slight rotative adjustment relatively to the first. The adjustment may be secured by means of a screw passing through a slot in one section into the other section, as indicated in Fig. 35. By this means the wall or abutment surfaces presented by the disks 97 may be made to more closely conform to the outline of the hook and eye that are to be positioned by said surfaces than if the latter were straight from side to side.

I shall now proceed to describe the hopper for the hooks and the devices for feeding or carrying the hooks from said hopper to positions under the needles of the sewing-machine.

As shown in Fig. 2 and dotted lines in Fig. 1, a web-bracket 98 is secured to the under side of the bed or table 40. Projecting from one side of its bracket are two socket-bearings 99, one for each of the two hook-hoppers. As said two hoppers and the feed devices from each are the same in all respects, I shall proceed to describe but one of them. A post 100 is secured in a socket 99 and is formed at its upper end with a horizontal socket or bearing to receive a cylindrical portion of a bracket 101, which supports the circular base or bottom 102 of the hook-hopper. As indicated in Figs. 1 and 2, the hook-hopper is preferably set at an angle about that illustrated in said figures, said angular position being also indicated in the detail Fig. 14$^a$. In Figs. 13 and 14, however, for convenience the inclined or angular position of the hook-hopper is not indicated. The rim or wall 103 of the hook-hopper supports a glass top 104, which is removably held in position by catches or clips 105. At the center of the hopper is a spindle or shaft 110, supported partly in an upper bearing 106, which is formed at the end of an arm 107, extending from the rim 103, a lower bearing for said shaft 110 being formed by a sleeve 108, which is held in fixed position in an opening in the hopper-bottom 102. The upper edge of the sleeve 108 is formed with a cam 109, (see Fig. 13,) the purpose of which will be presently described.

Secured to the upper end of the shaft 110 is a driving-pulley 111, whereby said shaft may be driven by means of a belt (indicated in Fig. 2) from any driving-pulley. (Not shown.) Secured to the shaft 110 between the bearings 106 and 108 is a hub having a plurality of arms 112. To the end of each arm 112 is pivotally secured a wing comprising main bars 114 and short parallel bars 115, projecting therefrom substantially at a right angle. The several bars are secured together, so as to clamp wipers 116, which will preferably be of some suitable flexible material, such as rubber or leather. The object of providing the short wiper-sections projecting from the main pivoted sections is so that each wing as it rotates in the direction of the arrow indicated in Fig. 13 will gather the hooks into the pockets formed between the short sections of the wiper. Then as each wing revolves the hooks will be spilled out of the pockets after they have been carried to the upper or higher portion of the inclined bottom of the hopper and will then slide back toward the lower portion of the hopper in a manner that will be presently more fully described. Each arm 112 is provided with a stop-pin 117, against which the inner portion of the wing will be normally held by means of a suitably-connected spring 118. As indicated in Fig. 13, the cam 109 is engaged by the inner end of each pivoted wing after it passes a little beyond its highest position, so that the wing will be tilted on its pivotal point against the pressure of the spring 118, so as to suddenly bring the wing to a position where all the pockets will spill the hooks. The bottom 102 of the hopper is formed with a radial opening 119, which opening is partly covered by a plate 120, as indicated in Figs. 13 and 14$^a$. As the hooks will be spilled from the pockets of the wings in the manner just described, they slide down the inclined bottom of the hopper, and those that are properly turned will catch upon the upper edge of the plate 120, with their hooks engaged by the thread of the worm feed-screw 121, so as to be carried radially out from the hopper in the manner that will be presently described.

The hook-feed screw 121 is formed with a ball 122 at one end fitting a suitable bearing 123, that is secured to the bottom of the stationary base 102. (See Fig. 14.) The other end of said feed-screw (see Fig. 17) is supported in a bearing 124, carried by the base or table of the machine. Near said bearing the feed-screw is formed with a worm 125. The pitch of the thread of this worm is such that it and the feed-screw may be rotated by a worm-wheel 126, mounted on a shaft 127, (see also Fig. 18,) said shaft being supported in a suitable bearing 128.

I shall now proceed to describe the mechanism for imparting to the worm 125 a step-by-step rotation, so that the rotation of the hook-feed screw will be stopped immediately upon the delivery of one hook and then given another rotation to advance another hook.

Referring first to Figs. 1 and 2, a gear 129 is mounted next to and so as to be rotated with the driving-pulley 43. Said gear 129 meshes with a gear 130, secured to a countershaft 131, to which shaft are also secured two gears 132, each one of these latter gears being for the purpose of imparting movement to one of the two hook-and-eye-feed mechanisms. As the two mechanisms are identical, I shall describe but one of them. Each gear 132 meshes with an idler-gear 133, which is supported in bearings carried by an elevated frame-bar 134, said bar being supported on legs 135, rising from the bed or table 40, as shown most clearly in Fig. 2. The countershaft 131 is supported in two brackets 136, which rise from the frame-bar 134, as shown in Fig. 17. A gear 137 (see Figs. 2, 3, and 17) is mounted loosely on a shaft 138, mounted in bearings 139, the latter rising from throat-plate 144, presently described, said gear 137 meshing with gear 133. Secured to the shaft 138 (see Fig. 18) is a disk 140, having a tooth 141. (See dotted lines in Fig. 17.) Secured to the worm-wheel shaft 127 is a disk 142, having a plurality of recesses adapted to receive the tooth 141 of the disk 140. This structure provides an intermittent gear which will result in the worm-wheel 126 being rotated and so as to actuate the hook-feed screw only while the tooth 141 is engaged with a recess of the disk 142. After the tooth 141 has left a recess it leaves the disk 142 in stationary position on its axis until the tooth 141 has been moved completely around, so as to engage the next recess of the disk 142 in a manner that will be readily understood. These parts are so proportioned and so operated relatively to each other as to timing that during each rotation of the tooth 141, and the consequent one-fourth rotation of the disk 142 and the worm-wheel 126, the hook-feed screw 121 will be given a single rotation on its axis so as to advance one hook to its position in the manner which I shall now describe.

In order that the hooks will be properly guided to position where they are joined to the eye, as hereinafter described, I provide a guide-trough 143. (See Figs. 17, 20, 21, and 22.) As the hooks are advanced along the edge of the plate 120, so as to emerge from the hook-hopper, they are carried into the trough 143 by the spiral thread of the feed-screw 121 and are pushed thereby along said trough, as will be readily apparent. The guide-trough is twisted or given a quarter-turn leading from the hook-hopper to the point of discharge indicated in Fig. 17, this point of discharge being over a throat-plate 144 in position to be engaged by the placing devices hereinafter described and engaged with the eyes and then moved over the throat to position to be secured to the card by the needles. The outer end of the guide-trough 143 is provided with a flange 145, which is secured to the throat-plate 144, the other or inner end of the trough being secured to the wall 103 of the hook-hopper.

The point where the hooks and eyes are delivered to be interengaged is best indicated in Figs. 27 to 30. I shall now describe the mechanism for bringing the eyes from their hopper to this same point.

Referring first to Fig. 2, the bracket 98, below the bed or table 40, carries a socket-piece 146, in which is mounted a post 147, in the upper end of which is received and secured a sleeve or tube 148. One end of this tube is formed with a circular flange from which two bars 149 extend, said two bars being united at their other ends by a web 150. Said web and two bars constitute a U-shaped frame. Fixed in the web 150 are two pins 151, on each of which a pinion 152 is mounted to rotate. A stud 153 passes through the web 150, between the two pins 151, and has its inner portion toothed, as at 154, this toothed portion being engaged by the pinions 152. Secured upon the outer end of the stud 153 is a hub 155. The circular plate 157, which forms one end of the hook-hopper and which may be of glass, is secured to the hub 155, and at the outer edge of said plate 157 is a ring 156. The inner end or head 158 of the hopper is mounted to rotate on the sleeve 148 and is formed with a peripheral groove 159, whereby the entire hopper may be rotated by means of a suitably-driven belt 160. (See Fig. 2.) A cylindrical shell 161 connects the head 158 with the ring 156. Wings 162 project inward from the inner wall of the shell 161 in such manner that the eyes in the hopper will be carried up by said wings as the hopper rotates and spilled off toward the center of the hopper for a purpose presently described. A cover or shield 163 is secured to the hub 155 and is formed to protect the pinions above described, so that the eyes will not become caught between said pinions. Said shield is, however, provided with openings for the passage of the eye-guides 164 and the wire spirals 165. The end of each eye-guide 164 is secured (see Fig. 26) to the inner end of one of the fixed pins 151, and therefore said eye-guide will not rotate. Each wire spiral 165 has one end secured to a pinion 152, which rotates on a pin 151.

Since the sleeve 148, bars 149, web 150, and pins 151 are all held from rotation while the pinions 152 are free to rotate on the pins 151 and are engaged by the toothed portion of the stud 153, it will be seen that the rotation of the cylindrical hopper, including the hub 155 and the stud 153, will cause the pinions 152 and the spirals 165 to rotate, so that the latter will carry the eyes that are in the guides 164 lengthwise of said guides. The direction of rotation of the parts relatively to each other is such that the eyes, which are spilled from the wings 162 and which drop astride of the guides 164, will hang from the latter in such position that portions of the eyes will be engaged by the rotating wire spirals 165 and will be slid along the guide 164 toward the right in Fig. 23. In order that loose eyes may not escape through the sleeve 148, I provide an exit-shield 166, as shown in Figs. 23 and 25. The shape of the eye-guide 164 is best shown in Figs. 4, 5, and 6. By comparing these figures with Figs. 1, 3, 17, and 18 it will be seen that the eyes which are engaged with the guide are pushed along said guide and eventually reach a portion of said guide, which is provided with a swelled or enlarged portion 167, this swelled portion engaging the loops of the eyes, so that the eyes cannot thereafter become disengaged from the guide until they reach its end. The portion of the guide which is provided with the described retaining enlargement is twisted or given a one-half turn, so that although the eyes first ride along the guide suspended therefrom, as in Fig. 5, they afterward, when they reach the feed-wheels presently described, are inverted, as shown in Fig. 6.

I shall now describe the feed-wheel mechanism which pushes the eyes along the guide and finally through an opening that is indicated in Fig. 17.

At the center of the bar 134, as shown in Fig. 3, is a depending bracket 168. (See Fig. 17.) Pivoted near the lower end of said bracket are upper and lower levers 169 and 170, each having bearings for a shaft 171, on which is mounted two feed-wheels 172, which wheels will preferably be of some elastic yielding material, such as felt or rubber. Each shaft is also provided with a pulley 173, and the two pulleys are driven by a single belt 174, leading from the shaft 131 and crossed between the two levers, so as to drive the upper and lower pairs of feed-wheels in opposite directions—that is, the upper two feed-wheels will bear upon the eyes carried by the two guide-strips 164 and will be driven in a direction to feed the eyes toward the right in Fig. 17—and the lower feed-rollers are revolved in such a direction as to engage the loops of the eyes on the under side of the guide-strip to aid this same feeding movement. From the outer end of the lower lever 170 a pin 175 rises between the two guide-strips, as shown in Fig. 3, and passes through a suitable opening in the end of the upper lever 169, the upper portion of said pin 175 being screw-threaded and provided with nuts 176 and 177. A spring 178 is located between the nut 176 and the end of the upper lever, and therefore tends to yieldingly hold the two levers and their feed-wheels pressed toward each other, the nut 177 serving as an adjustable stop to limit the point of approach of the two levers and their feed-wheels.

Secured to the bracket 168 is the inclined casing 179 of the slide, which carries the eyes to the position hereinafter described. The parts now referred to are best shown in Figs. 3, 17, 18, 19 and 28 to 30. The casing 179 is formed with an opening 180, (see Fig. 17,) to which the eye-guide strip leads and through which the eyes will be successively pushed. In said Fig. 17 a bracket 181 is shown as a support for the free end of the guide-strip. In the back of the casing 179 when looking at said casing as shown in Fig. 17 is formed a dovetail groove 182, in which is mounted a slide 183, having a pin 184. (See dotted lines in Fig. 17.) This slide is reciprocated by means of an arm 185 of a rock-shaft 186, said arm having a slot which receives the pin 184. The said rock-shaft (see Fig. 19) has secured to it an arm 187, formed with a slot 188, along which latter is adjustably set a pin 189. An eccentric 190 is secured to the shaft 138, and the eccentric-strap 191 is connected by pitman 192 with the pin 189. By adjusting the pin 189 lengthwise of the slot 188 the amount of the throw or reciprocations of the slide 183 will be varied, as will be readily understood. The movements of the arm 185 will be sufficient to carry the slide 183 from the position indicated in Fig. 17 to a point where the lower end of said slide will be opposite or a trifle above the opening 180, through which the eyes are fed. The lower end of the slide is formed with a recess or pocket 93, as shown in Figs. 28 to 30 and indicated by dotted lines in Fig. 17. This recess or pocket is of a form that will receive one eye flatwise therein. It is of a depth so that when one eye has been pushed in no more can enter, and when the slide moves downward after the pocket has received an eye the face of the slide will prevent the entrance of the next eye until the pocket has been again raised empty to a point opposite the opening 180. In Figs. 28 to 30 only the lower end of the slide 183 is shown, owing to these figures being drawn on the line 28 28 of Fig. 17. Secured in a recess in the face of the casing 179 is a flat spring 194, the lower edge of which is free, so that although it will normally hold an eye in the pocket of the slide when in the position shown in Fig. 17, yet said spring can be flexed, as indicated in Fig. 29 and as hereinafter described.

It is to be understood that the construction of the hook-hoppers and feed mechanism therefrom and the eye-hopper and the feed mechanism is such that the guides leading therefrom will be kept entirely filled with the articles. In the hook-hopper if the edge of the plate 120 is completely filled with the hooks no more can catch thereupon, and in the eye-hopper the guides 164 cannot become overcrowded, because when they are filled no more eyes will drop upon the guides between the spirals 165 until the eyes have been moved along the guides and used up by the operation of the machine, so as to provide room for the deposit of more eyes by the rotation of the hopper in the manner hereinbefore described. Reciprocations of the slide 183 carry the eyes successively to position relatively to the hooks, as indicated in Figs. 17 and 28.

I shall now describe the mechanism for interengaging the hooks and eyes and moving them together in a horizontal plane so that they will be placed on the card as indicated in Fig. 18. In said Fig. 18 four pairs of hooks and eyes are represented, the two at the left having been sewed to card 46 and the two at the right having the four needles passing through their thread-eyes. It may be repeated here in connection with Fig. 18 that there are two mechanisms for feeding the hooks and eyes, so that two rows will be attached to the card, but in said Fig. 18 the mechanism that would be located adjacent to the lower edge of the card is omitted from the illustration, as it would be a duplicate of the mechanism shown adjacent to the upper edge of the card in said figure.

Secured to the shaft 138 is a cam-grooved cylinder 195, as shown in Figs. 1 and 3. The cam-groove in said cylinder receives a pin 196, (see Fig. 27,) rising from a slide 197, mounted to reciprocate in guides 198 on the plate 144. One end of said slide is provided with a pin or stud shaft on which is mounted a sleeve 199, the sleeve being adapted to rock on said pin or stud shaft. Secured to this rock-sleeve and projecting therefrom in a direction substantially in line with the slide 197 is an arm 200, provided with a short lateral arm 201, having two small bosses 202 (see Fig. 28) on its lower side. The arm 200 and its short arm and bosses serve to place or shift the hooks and eyes from a position where they are delivered by their feeding mechanisms to a position where the needles of the sewing-machine may carry the threads through the thread-eyes of the hooks and eyes, a card being of course in position to receive the hooks and eyes and the sewing-threads, said card being moved by the feed-dog of the sewing-machine in the direction of the arrow in Fig. 18. The extent of the reciprocation imparted to the placing or shifting arm 200 by the cam-groove of the cylinder 195 is indicated by the full and dotted lines in Fig. 27 and also by comparing Figs. 28 and 30. As shown in Fig. 27, the rock-sleeve 199 is provided with a rearwardly-extending arm 203, having a lateral pin 204. A spring 205, secured under the pivot of the rock-sleeve and bearing on the under edge of the arm 203, normally tends to rock the sleeve, so that the placing-arm 200 will bear downward. Secured to and rising from the plate 144 is a bracket 206, having a rigid horizontal arm 207, the lower edge of which serves as a guide for the pin 204 when the latter is moving outward or forward, as hereinafter described. The lower edge of this guide-arm 207 is cut away so as to form front and rear cam edges 208 and 209, respectively, for a purpose that will be presently described. A finger 210 is pivoted at 211 to the bracket 206 and is formed with a vertical slot 212 at its outer end and is normally pressed upward by a spring 203. A pin 214 projects from one side of the guide-arm 207 and through the slot 212, said pin and slot serving to limit the amount of swing of the pivoted finger 210. The lower front edge of the finger 210 is provided with a guide-flange 215, (see dotted lines in Fig. 29,) said guide-flange projecting under the guide-arm 207 in position to be engaged by the pin 204, as presently described.

The placing or shifting arm 200 is so connected with the rock-sleeve 199 that the forward portion of said arm 200 may rest closely upon the thin forward portion of the plate 144 when the arm 203 is pressed upward; but when the slide 197 is retracted to the position shown in Fig. 28 the pin 204 rides on the rear cam 209 of the rigid guide-arm 207, and the end of the arm 200 and its bosses will be raised so that the hook $x$ may be pushed under it by the hook-feed mechanism hereinbefore described. Upon the first advance movement of the slide 197 the pin 204 leaves the cam 209 and the bosses 202 of the placing-arm will engage the thread-eyes of the hook $x$, owing to the action of the spring 205. Continued advance of the slide causes the hook to be moved forward toward the position indicated in Fig. 29, so that its bill will engage the eye $y$, which is at this time held in the recess 193 of the eye-feed slide 183. Further movement in the same direction causes the hook $x$ to pull the eye $y$ out from its pocket or recess, the spring 194 yielding for this purpose. Still further movement in the same direction carries the interengaged hook and eye to the position indicated in Fig. 30, (and also in Fig. 18,) where they will be sewed to the card. At the extreme forward movement of the slide 197 the pin 204 rides under the edge of the fixed cam 208, so that the placing or shifting arm 200 will be lifted, as shown in Fig. 30, ready for the return movement, it being necessary to so lift the arm that its short lateral portion 201 (shown in Fig. 27) may clear the bill of the hook $x$. During this forward movement just described the pin 204 will ride on the upper surface of the flange 215 of the finger 210 and depress said finger to the position shown in Fig. 29, the rear end of said guide-flange 215 being so formed as to cause it to be pressed downward by the first forward movement of the pin 204; but after the pin 204 has reached the position shown in Fig. 30 the finger 210 is thrown upward by its spring 213, so that the flange 215 moves up into and substantially fills the recess in the arm 207 between the two cams 208 and 209. Therefore on the return of the slide 197 and the placing device the pin 204 will ride along the lower surface of the flange 215 and be guided thereby, so that during the entire rearward movement of the placing-arm 200 it will be retained in substantially the upwardly tilted or inclined position shown in Fig. 30 until it gets back to the position shown in Fig. 28 and by full lines in Fig. 27.

Of course the timing of the operations of the different parts of the machine is such that while the placing or shifting mechanism is in the advanced position the sewing-machine needles descend and engage the thread-eyes of the hooks and eyes and also at this time no feed of the card takes place. The feed of the card and the rise of the sewing-machine needles will occur during and while the hook-and-eye-shifting devices are retracted.

It will be readily understood, of course, that only one card will be fed through the machine during a number of stitches that not only unite the two groups of hooks and eyes to the cards, but also carry the stitches to the end of one card and partly onto the next, so as to leave quite a margin between the ends of the card and the ends of the two groups of attached hooks and eyes. Suitable mechanism which may be employed for carrying power to the disk 78, which actuates the card-feed mechanism, is shown in Figs. 1 and 2. On a shaft of the disk 78 is a large sprocket-wheel 216, said sprocket-wheel being connected by a chain 217 with a small sprocket-wheel 218, which is secured so as to rotate with a gear 219, this latter gear meshing with a pinion 220 (see dotted lines in Fig. 2) on the shaft of the driving-pulley 43. It will be seen that the connections just described provide for a very slow movement of the card-feed-actuating disk 78 relative to the other parts of the machine.

As above described, the gear 137 is loose on the shaft 138. To connect it with said shaft so that it will drive the latter, I provide a form of clutch which may be as follows: On the shaft 138 is splined a disk 221, (see Fig. 3,) the hub 222 of said disk being formed with a peripheral groove 223. In the disk 221 is mounted a pin 224, said pin projecting toward the gear 137 and adapted to enter a hole or recess 225 in the latter. (See dotted lines in Fig. 3.) The pin 224 will in practice be preferably spring-pressed in the direction to cause it to engage in said recess 225 when the disk is shifted against the gear. It will be readily understood that, in effect, the disk 221 and its pin constitutes one member of the clutch, of which the other member will consist of the gear 137 and its recess 225. When said clutch is disconnected, as indicated in Fig. 3, the gear 137 will run loose upon the shaft 138, and therefore no movement will be transmitted to said shaft. Since the said shaft 138 causes, through the mechanism hereinbefore described, the advance of both the hooks and the eyes to the point of assembling them, there will be no such feed of the hooks and eyes when the clutch members are separated, although the sewing-machine will continue to operate and the cards to be fed. The clutch will be automatically shifted, by mechanism presently described, at certain periods, so that a certain number (such as twelve in each row) of the hooks and eyes will be attached to the card, and then the feed of the card and the operation of the sewing-machine will continue so as to run lock-stitches to the end of the card and then for a short distance onto the next card, when the clutch will be again shifted to cause the feed of more hooks and eyes in groups, as described. To shift the hub 222 along its spline on the shaft 138, the arms of a yoke 226 enter the groove 223 of said hub. (See Fig. 19.) The yoke 226 rises from a frame 227, pivoted at 228 to the plate 144, and having an arm 229, provided with a pin which enters a cam-groove 230, formed in the periphery of a cylinder 231, secured to a short counter-shaft 232. (See Figs. 1 and 3.) Said shaft 232 is mounted in suitable bearings 233 and has secured to its outer end a gear 234, meshing with a pinion 235 at the end of the shaft 138. Since the shaft 138 is constantly revolving during the operation of the machine, it will constantly impart movements to the gear 234 and the cam-grooved cylinder 235. This cylinder and its cam-groove may be replaced by another having a different form of groove that will cause the clutch to be shifted at different times. Preferably it will have such form as to act as a counter that will hold the clutch members in engagements for such a length of time as will result in the application of twelve pairs of hooks and eyes to a card.

It will be seen that I have provided a machine of the character described in which the card-magazine is at one end of the table or support across which the cards move to the mechanism which fastens the hooks and eyes to the cards, the hook-hopper and eye-hopper being located at the other end of the same table, and the mechanism which completes the work is located at an intermediate point. Therefore all of the operative parts of the entire machine are substantially in a horizontal plane, where they are all readily accessible for repair or adjustment or renewing the supply for the different parts. It will also be observed that all of the parts of the machine are capable of being adjusted so as to accommodate different sizes of cards or of hooks and eyes—that is, such portions as would require adjustment for such purpose are so constructed in this machine.

Having described the operation of the several parts of the machine in connection with the description of the details of structure, it will not be necessary to present a résumé of the entire operation further than to say that the cards and the hooks and the eyes will be placed in their respective hoppers by an attendant, the hook and eye hoppers having of course suitable openings for the purpose, and the machine started, after which, barring accidents, the machine can be left to run until hundreds of cards have been supplied with the hooks and eyes in predetermined groups. After the cards leave the sewing-machine mechanism they may drop through a suitable opening (not shown) in the table 40.

Having now described and illustrated my invention in one of the forms in which it may be embodied, what I claim is—

1. A machine for securing hooks and eyes on cards, comprising a card-magazine at one end of the table, and a hook-hopper and eye-hopper at the other end of the table, means for feeding the cards and the hooks and eyes toward an intermediate point, and means for securing the hooks and eyes to the cards at such intermediate point.

2. A machine for securing hooks and eyes on cards, comprising a card-magazine at one end of the table, said magazine being adjustable as to its capacity, a hook-hopper and an eye-hopper at the other end of the table and vertically adjustable relatively thereto, means for feeding cards and hooks and eyes toward an intermediate point, and means for securing the hooks and eyes to the cards at such intermediate point.

3. A machine for securing hooks on cards, comprising means for automatically supplying and feeding cards singly, a hook-hopper, hook-positioning means, means for positively and continuously feeding the hooks in spaced or separated positions from the hopper to said positioning means, and means for fastening the hooks to the cards.

4. A machine for securing hooks and eyes on cards, comprising means for automatically supplying and feeding cards singly, hook and eye hoppers, hook-and-eye-positioning means, means for positively feeding hooks and eyes from their hopper to their positioning means, means being provided for keeping the hooks spaced or separated as they are fed, and means for fastening the hooks and eyes to the cards.

5. A machine for securing hooks and eyes on cards, comprising means for automatically supplying and feeding cards singly, hook and eye hoppers, means for interengaging the hooks and eyes and positioning them relatively to a card, means for positively feeding hooks and eyes from their hoppers to their positioning means, means being provided for keeping the hooks spaced or separated as they are fed, and means for fastening the hooks and eyes to the cards.

6. A machine for securing hooks and eyes on cards, comprising a card-magazine, a pneumatic picker pivotally mounted relatively to one end of the magazine, a plurality of yielding retainer-buttons for preventing the escape of more than one card at a time from the magazine, and mechanism for feeding hooks and eyes and fastening them to the cards.

7. A machine for securing hooks and eyes on cards, comprising means for feeding hooks and eyes to the cards, means for interengaging the hooks and eyes means for fastening the hooks and eyes to the cards, and means for automatically interrupting the feed of hooks and eyes whereby the number of hooks and eyes fastened to each card will be automatically controlled so as to group the hooks and eyes according to a predetermined number.

8. A machine for securing hooks and eyes on cards, comprising means for feeding the cards, means for running continuous lines of stitches along the cards in succession, means for placing hooks and eyes relatively to the cards so as to be sewed thereto, and means for interrupting the supply of hooks and eyes.

9. A machine for securing hooks and eyes on cards, comprising means for feeding cards, means for feeding hooks, means for feeding eyes, mechanism for interengaging the hooks and eyes and securing them to a card, and means whereby the feeding of hooks and eyes will be automatically interrupted.

10. A machine for securing hooks and eyes on cards, comprising a card-hopper, an oscillatory pneumatic picker for removing the cards one by one from the magazine, and means for securing hooks and eyes in pairs, to the cards.

11. A machine for securing hooks and eyes on cards, comprising card-feeding means, hook-and-eye-feeding devices, said devices including means to yieldingly hold the eyes successively and a slide having a single placing or shifting arm provided with a lateral offset and having means whereby said offset may be depressed upon each hook, means for actuating the slide and placing-arm to shift the hooks successively in a direction at an angle to the plane of the eyes whereby the bills of the hooks will engage the eyes and remove them from the feeding mechanism, and means whereby continued movement of the hook-shifting devices will carry the engaged hooks and eyes onto the cards.

12. A machine for securing hooks and eyes on cards, comprising sewing mechanism, a presser-foot having a toothed wheel, notched disks connected to rotate with said wheel, the sides of the notches of the disk forming abutments for hooks and eyes, means for feeding cards under the presser-foot, and means for supplying hooks and eyes adjacent to said abutment.

13. A machine for securing hooks and eyes on cards comprising sewing mechanism, a presser-foot having a toothed wheel, notched disks connected to rotate with said wheel, the sides of the notches of the disk forming abutments for hooks and eyes, means for feeding cards under the presser-foot, and means for supplying hooks and eyes, adjacent to said abutment, each of said disks comprising two sections adjustably connected.

14. A machine for securing hooks on cards, comprising a hook-hopper having an inclined bottom formed with a radial opening, a hook-guiding plate projecting over said opening, means for sweeping the hooks about on the bottom of the hopper to cause them to engage the edge of said plate, card-feeding mechanism, mechanism for securing the hooks to the cards, and means for conveying the hooks from the end of said plate to position to be secured to the cards.

15. A machine for securing hooks and eyes on cards, comprising a hook-hopper having an inclined bottom formed with a radial opening, a hook-guiding plate projecting over said opening, means for sweeping the hooks about on the bottom of the hopper to cause them to engage the edge of said plate, a worm feed-screw below said plate, means whereby said screw will deliver the hooks singly, card-feeding means, eye-feeding means, and mechanism for securing the hooks and eyes to the cards.

16. A machine for securing hooks and eyes on cards, comprising a rotating cylindrical hopper having internal wings and adapted to receive eyes, eye-guides leading therefrom and adapted to deliver eyes singly, spiral devices for moving the eyes out of the hopper along said guides, card-feeding means, hook-feeding means, and mechanism for securing the hooks and eyes to the cards.

17. In a machine of the character described, a card-magazine comprising a slotted bottom, a follower projecting through said bottom, means for moving said follower longitudinally of the magazine, a pneumatic picker for removing cards one by one from the other end of the magazine, hook-and-eye-supply devices, means for assembling the hooks and eyes and cards in proper relative positions, and means for securing the hooks and eyes to the cards when so assembled.

18. In a machine of the character described, a card-magazine comprising a slotted bottom and a follower projecting through said bottom, said follower having a finger pivoted thereto, a screw with which the end of said finger engages, a pneumatic picker, means for rotating the screw to cause the follower to move the cards toward the picker, hook-and-eye-supply devices, means for assembling the hooks and eyes and cards in proper relative positions, and means for securing the hooks and eyes to the cards when so assembled.

19. In a machine of the character described, a card-magazine comprising a slotted bottom, a follower projecting through said bottom, means for moving the follower, pivoted links at the sides of the hopper, side pieces connecting the upper ends of the links, means for adjusting the angle of the links relatively to said bottom, a picker for removing the cards one by one from the end of the magazine, hook-and-eye-supply devices, means for assembling the hooks and eyes and cards in proper relative positions, and means for securing the hooks and eyes to the cards when so assembled.

20. In a machine of the character described, a card-magazine comprising a bottom portion having side flanges and angle-brackets formed with curved slots, links pivoted to said side flanges, screws passing through the slots of said brackets and into said links whereby the angular position of said links may be adjusted, side pieces connecting the upper ends of the links, a follower movable lengthwise of the magazine, a picker for removing the cards one by one from the magazine, hook-and-eye-supply devices, means for assembling the hooks and eyes and cards in proper relative positions, and means for securing the hooks and eyes to the cards when so assembled.

21. In a machine of the character described, the combination with a card-magazine, of a follower movable lengthwise thereof, a screw operatively connected with the follower to move the latter, a ratchet secured to said screw, a pawl engaging said ratchet and having a foot-piece, a pivoted picker for removing the cards one by one from the magazine, a projection from said picker to engage the foot of the pawl to cause the latter to actuate the screw, hook-and-eye-supply devices, means for assembling the hooks and eyes and cards in proper relative positions, and means for securing the hooks and eyes to the cards when so assembled.

22. In a machine of the character described, the combination with a card-magazine, of a follower therefor, a screw parallel with the path of movement of the follower, means for actuating said screw, a finger-piece pivoted to said follower and having a portion to engage said screw to cause the movement of the screw to actuate the follower when the finger-piece is in engagement with said screw, hook-and-eye-supply devices, means for assembling the hooks and eyes and cards in proper relative positions, and means for securing the hooks and eyes to the cards when so assembled.

23. In a machine of the character described, the combination with a card-magazine having a follower movable longitudinally thereof, of an adjustable portion at the top of said follower and having means whereby its angle relatively to said follower may be varied, means for moving the follower and its adjustable portion longitudinally of the magazine, hook-and-eye-supply devices, means for assembling the hooks and eyes and cards in proper relative positions, and means for securing the hooks and eyes to the cards when so assembled.

24. In a machine of the character described, a card-magazine having two yielding retainer-buttons mounted at each side of the outlet from the magazine, a follower, a picker for removing the cards one by one past said buttons, hook-and-eye-supply devices, means for assembling the hooks and eyes and cards in proper relative positions, and means for securing the hooks and eyes to the cards when so assembled.

25. In a machine of the character described, the combination with a card-magazine having a follower, of a pneumatic picker pivoted below the plane of the bottom of the magazine, a lever adjustably connected therewith, means for actuating said lever to swing the picker, hook-and-eye-supply devices, means for assembling the hooks and eyes and cards in proper relative positions, and means for securing the hooks and eyes to the cards when so assembled.

26. In a machine of the character described, the combination with a card-magazine having a follower, of a pneumatic picker pivoted below the plane of the magazine, a lever adjustably connected with said picker and having a slotted portion, a crank-pin engaging the slot of the lever, means for rotating the crank, hook-and-eye-supply devices, means for assembling the hooks and eyes and cards in proper relative positions, and means for securing the hooks and eyes to the cards when so assembled.

27. In a machine of the character described, the combination with a card-magazine having a follower, of a pneumatic picker pivoted below the plane of the magazine, a lever connected with said picker intermediate of its ends and having one end provided with a curved transverse slot, a bolt extending through said curved slot and adapted to secure the lever in adjusted position, the other end of said lever being longitudinally slotted, a power-driven crank-pin entering the longitudinal slot of the lever, hook-and-eye-supply devices, means for assembling the hooks and eyes and cards in proper relative positions, and means for securing the hooks and eyes to the cards when so assembled.

28. In a machine of the character described, the combination with a card-magazine having a follower, of a pneumatic picker pivoted at a point below the plane of the magazine, a pawl mounted on said picker so as to swing therewith, the end of said pawl being adapted to engage the card removed by the picker, means for oscillating the picker and pawl, hook-and-eye-supply devices, means for assembling the hooks and eyes and cards in proper relative positions, and means for securing the hooks and eyes to the cards when so assembled.

29. In a machine of the character described, the combination with a card-magazine, of a pneumatic picker pivoted at a point below the the plane of the magazine, a pawl pivotally connected with the picker and adapted to engage a card removed by the picker, a spring laterally connecting the pawl with the picker, a screw passing through a portion of the pawl and bearing against the picker whereby the pawl may be adjusted on its pivot, means for oscillating the picker and pawl, hook-and-eye-supply devices, means for assembling the hooks and eyes and cards in proper relative positions, and means for securing the hooks and eyes to the cards when so assembled.

30. In a machine of the character described, the combination with a card-magazine having a follower, of a pneumatic picker pivotally supported at a point below the plane of the magazine, means for oscillating said picker, a pawl having a yielding tooth at its outer end adapted to engage a card removed from the magazine by the picker, means whereby said pawl is adjustably connected with the picker, hook-and-eye-supply devices, means for assembling the hooks and eyes and cards in proper relative positions, and means for securing the hooks and eyes to the cards when so assembled.

31. In a machine of the character described, the combination with a card-magazine and means for feeding cards therefrom, of a feed-dog and a presser-foot between which the cards are passed from said magazine, a toothed wheel mounted on said presser-foot, notched disks mounted to rotate with said wheel, means for placing hooks and eyes on a card in positions abutting the sides of the notches of said disks, and means for securing the hooks and eyes to the cards.

32. In a machine of the character described, a hook-and-eye-locating device comprising a toothed wheel, a shaft to which said wheel is secured, notched disks also secured to said shaft and adapted to be rotated by the engagement of a card with the toothed wheel and the edgewise movement of said card.

33. In a machine of the character described, a presser-foot and feed-dog, means for feeding a card between them, a movable gage or abutment for determining the position of hooks and eyes, said gage or abutment being mounted on the presser-foot, and means adapted to be engaged by the card to transmit movement of the card to said gage or abutment.

34. In a machine of the character described, a presser-foot and feed-dog, means for feeding a card between them, a toothed wheel mounted on the presser-foot and adapted to be rotated by engagement of the card therewith, and a movable gage or abutment connected with said toothed wheel to rotate therewith.

35. In a machine of the character described, a presser-foot and feed-dog, means for feeding a card between them, a toothed wheel mounted on the presser-foot and adapted to be rotated by engagement of the card therewith, and a plurality of notched disks connected to rotate with said wheel, the notches of said disks having walls to serve as gages or abutments for hooks and eyes.

36. In a machine of the character described, a presser-foot and feed-dog, means for feeding a card between them, said presser-foot having recesses formed in its edge, a shaft mounted on the presser-foot, and a toothed wheel and a notched disk connected with said shaft and extending into said recesses.

37. In a machine of the character described, a presser-foot and feed-dog, means for feeding a card between them, said presser-foot having recesses formed in its edges, a shaft yieldingly mounted on the presser-foot and carrying notched disks and a toothed wheel, the teeth of the latter being adapted to be engaged by the card, and means whereby the position of the said shaft may be varied relatively to the plane of movement of the card.

38. In a machine of the character described, a presser-foot and feed-dog, means for feeding a card between them, said presser-foot having recesses formed in its edges, a frame pivotally mounted on the presser-foot, a shaft mounted on the frame, a toothed wheel and notched disk connected with said shaft and extending into said recesses, and a spring connected with the frame to cause the wheel and disk to exert yielding pressure on the card.

39. In a machine of the character described, the combination with a hook-hopper having means whereby hooks may be discharged therefrom, of a worm feed device adapted to engage hooks as they are discharged from the hopper, and means whereby hooks will be retained in engagement with the thread of the worm until they reach the point of discharge.

40. In a machine of the character described, the combination with a hook-hopper having means whereby hooks may be discharged therefrom, of a worm feed device adapted to engage hooks as they are discharged from the hopper, and a trough adjacent to the worm feed device to retain hooks in engagement therewith until they reach the point of discharge.

41. In a machine of the character described, the combination with an inclined hopper having a flat bottom provided with a radial slot and a hook-guiding plate projecting over the slot, of a feeding-screw for carrying away hooks engaged with said plate, wings for moving the hooks around on said bottom toward said slot and plate, and means for rotating the wings.

42. In a machine of the character described, a hook-hopper having a flat inclined bottom formed with a slot, a circular rim or wall, a top, a spindle or shaft having suitable bearings in the top and bottom, means for rotating said spindle, arms carried by the spindle and provided with wings adapted to sweep hooks around said bottom, and means for removing hooks from said slot.

43. In a machine of the character described, a hook-hopper having a flat inclined bottom formed with a slot, a circular rim or wall, a top, a spindle or shaft having suitable bearings in the top and bottom, means for rotating said spindle, arms carried by the spindle, wings pivotally connected with the outer ends of said arms and adapted to sweep the hooks around said bottom, means whereby the wings will be automatically turned on their pivots as they approach the slot in the bottom, and means for removing hooks from said slot.

44. In a machine of the character described, a hook-hopper having an inclined bottom formed with a slot, a rotary shaft, an arm projecting therefrom and having a wing at its outer end, said wing having a series of short parallel projections from one side whereby pockets are formed, and means whereby hooks delivered through said slot will be carried away from the hopper.

45. In a machine of the character described, a hook-hopper having an inclined bottom formed with a slot, a hook-guiding plate projecting over said slot, a rotary shaft, an arm projecting therefrom, a wing having pockets and pivotally connected with said arm, a stationary cam engaged by the inner end of the wing, and a spring for preserving the engagement of the inner end of the wing with said cam.

46. In a machine of the character described, a hook-hopper comprising an inclined bottom formed with a slot, a plate projecting from said slot, and a central fixed bearing formed with a cam, a rotary shaft having arms provided with pins 117, wings having pockets and pivotally connected with the outer ends of the arms, and springs connected to normally press the wings toward said pins whereby the inner ends of the wings will successively engage said cam as the shaft and arms rotate.

47. In a machine of the character described, a hook-hopper comprising an inclined bottom formed with a slot, a plate projecting over said slot, a central fixed bearing formed with a cam, a rotary shaft having arms provided with pins 117, wings having flexible portions adapted to engage the hooks on said bottom, said wings being pivotally connected with the outer ends of the arms, and springs connected to normally press the wings toward said pins whereby the inner ends of the wings will successively engage said cam as the shaft and arms rotate.

48. In a machine of the character described, a stationary hook-hopper having a flat bottom formed with a slot and having a plate provided with an edge adjacent to said slot and adapted to be engaged by the hooks, means for positively moving the hooks in the hopper toward the edge of said plate, and means for positively removing the hooks engaged with the edge of said plate.

49. In a machine of the character described, a hook-hopper including an inclined bottom formed with a slot, a rotary shaft having arms, and a wing connected with each arm, each wing comprising main bars and parallel bars projecting therefrom and flexible wipers secured to said bars.

50. In a machine of the character described, a hook-hopper including an inclined bottom formed with a slot, a plate having an edge adjacent to said slot, a rotary shaft carrying a wing having a wiper to move hooks toward the edge of the plate, and means for removing the hooks engaged with the edge of said plate.

51. In a machine of the character described, the combination with a hopper having a fixed bottom formed with an opening or slot and containing means for positively sweeping hooks toward such opening or slot, of a worm feed device below said opening and supported at one end by said hopper, and means for guiding the hooks removed by said worm feed device.

52. In a machine of the character described, the combination with a hopper having a fixed bottom and containing means for sweeping hooks toward an opening in said bottom, of a worm feed-screw below said opening and having a ball-shaped end, a bearing for said ball-shaped end and carried by said bottom, and means for guiding the hooks removed by said screw.

53. In a machine of the character described, the combination with a hopper having a fixed bottom and containing means for sweeping hooks around said bottom, said bottom being formed with a radial slot, a plate having its edge projecting over said slot, a worm feed-screw mounted in a bearing below said plate, means for rotating said screw, and a guide extending along said screw beyond the opening from the hopper to hold the hooks in engagement with the thread of the screw after they leave the opening.

54. In a machine of the character described, the combination with a hopper having a fixed bottom and containing means for sweeping the hooks around said bottom, said bottom being formed with a radial slot, a plate having its edge projecting over said slot, a worm feed-screw mounted in bearings below said plate, means for rotating said screw intermittently, and a guide extending along said screw beyond the opening from the hopper to hold the hooks in engagement with the thread of the screw after they leave said opening.

55. In a machine of the character described, the combination with a hook-feed screw and means for supplying hooks thereto, of a guide-trough adjacent to said screw for holding the hooks in engagement with the screw, said trough being twisted between its ends so as to extend partially around the screw to change the positions of the hooks as they pass from the point of supply to the point of discharge.

56. In a machine of the character described, a rotatively-mounted hopper, an eye-guide strip extending substantially axially thereof, means whereby said strip is held against rotation, means for causing eyes in the hopper to engage said strip, and means for moving eyes engaged with said strip in a direction to carry them out of the hopper.

57. In a machine of the character described, a rotatively-mounted hopper, an eye-guide strip extending substantially axially thereof, and a rotary spiral surrounding said strip, means being provided for causing eyes in the hopper to drop toward the center of the hopper to engage said strip.

58. In a machine of the character described, a cylindrical hopper having its axis in a substantially horizontal plane, means for rotating the hopper, an eye-guide strip extending axially of the hopper, means for holding said strip against rotation, and a rotary spiral surrounding said strip, means being provided for rotating said spiral and for causing eyes in the hopper to engage said strip.

59. In a machine of the character described, a rotatively-mounted hopper, a pair of eye-guiding strips fixedly supported axially of the hopper, a spiral surrounding each strip, means whereby said spirals may be caused to rotate about said strips, and means whereby eyes in the hopper may be caused to engage the strips and be moved lengthwise thereof by the spirals.

60. In a machine of the character described, an eye-hopper comprising a fixed sleeve or tube, a frame supported thereby, a reservoir for the eyes supported on said sleeve and frame and having internal wings, an eye-guide strip fixedly connected with said frame, a spiral surrounding said strip, means for rotating the reservoir, and connections whereby rotation of the reservoir will impart a rotary movement to said spiral.

61. In a machine of the character described, an eye-hopper comprising a fixed sleeve or tube, a frame supported thereby, a reservoir for the eyes supported on said sleeve and frame and having internal wings, stud-pins fixed in the outer end of said frame and having eye-guide strips fixed thereto and extending therefrom and through the sleeve, pinions mounted on said pins, spirals surrounding said strips and connected with said pinions, a stud having a toothed portion meshing with said pinions and having a bearing in said frame the stud being connected with the reservoir, and means whereby said reservoir may be rotated.

62. In a machine of the character described, an eye-hopper comprising a fixed sleeve or tube, a frame supported thereby, a reservoir for the eyes supported on said sleeve and frame and having internal wings, stud-pins fixed in the outer end of said frame and having eye-guide strips fixed thereto and extending therefrom through the sleeve, pinions mounted on said pins, spirals surrounding said strips and connected with said pinions, a stud having a toothed portion meshing with said pinions and having a bearing in said frame, the said stud being connected with the reservoir, means whereby said reservoir may be rotated, a shield being provided at one end of the reservoir to cover the pinions and means being provided at the other end of the reservoir to prevent the escape of loose eyes through the sleeve.

63. In a machine of the character described, the combination with an eye-guide strip and means for supplying eyes thereto, of feed-rolls located on opposite sides of the strip, means for actuating said rolls to cause them to push the eyes along said strip, and means for yieldingly pressing the rolls toward each other.

64. In a machine of the character described, the combination with an eye-guide strip and means for supplying eyes thereto, of two feed-rolls located on opposite sides of the strip, levers carrying said rolls, means for yieldingly pressing the levers and rolls toward each other, and means for actuating said rolls to cause them to push the eyes along the guide.

65. In a machine of the character described, the combination with a slide having an eye-pocket at one end, of means for feeding eyes successively to said pocket, means for reciprocating the slide, and means whereby an eye in said pocket will be retained therein until forcibly removed.

66. In a machine of the character described, the combination with a slideway having an opening to permit the passage of an eye through it, of a slide mounted within said slideway and having an eye-recess at its end, means for reciprocating the slide, an eye-guide strip terminating opposite the opening of the slideway in position to deliver eyes to said opening, and means for supplying a quantity of eyes to said guide and positively pushing them toward said opening.

67. In a machine of the character described, the combination with a slide having an eye-pocket at one end, of means for feeding eyes successively to said pocket, means for reciprocating the slide, means whereby an eye in said pocket will be retained therein until forcibly removed, and means for feeding hooks and successively engaging their bills with the eyes presented by said slide.

68. In a machine of the character described, the combination with a slideway having an opening to permit the passage of an eye, of a slide mounted in said slideway and having an eye-recess at its end, means for reciprocating the slide, an eye-guide strip terminating opposite the opening of the slideway in position to deliver eyes to said opening, means for supplying a quantity of eyes to said guide and pushing them toward said opening, said means including a hopper and devices for supplying eyes to the guide-strip, and rotating feed-rolls for pushing the eyes along said guide-strip.

69. In a machine of the character described, the combination with a pair of eye-guides and means for supplying eyes thereto, of levers 169 170 each having a pair of feed-rolls 172 and a pulley, means engaging the pulleys for driving the rolls, a pin 175 extending from one lever through the other, nuts 176 177 on said pin, and a spring 178 between the upper lever and one of said nuts.

70. In a machine of the character described, the combination with the casing or guideway 179 having an eye passage-way 180, of a slide 183 having a recess 193 in its lower end and provided with a pin 184, a rock-shaft having a slotted arm 185 engaging the pin 184 and having also an arm 187, and means for actuating said arm 187 to oscillate the rock-shaft and reciprocate the slide.

71. In a machine of the character described, the combination with the casing or guideway 179 having an eye passage-way 180, of a slide 183 having a recess 193 in its lower end and provided with a pin 184, a rock-shaft having a slotted arm 185 engaging the pin 184 and having also an arm 187 formed with a slot 188, a driving-shaft having an eccentric 190, and an eccentric-strap and pitman, the latter being connected with a pin 189 adjustable in the slot of the arm 187.

72. In a machine of the character described, the combination with a casing or slideway 179 having a passage-way 180, of a slide 183 having a recess 193 in its lower end, means for reciprocating the slide, a plate-spring 194 secured to said casing and projecting across the lower end of the path of movement of the slide, means for feeding eyes singly to the slide, and means for supplying the hooks and pushing them singly to cause the bills of the hooks to engage the eyes delivered by the slide, said spring 194 yielding to permit the eyes to be removed by the hooks from the recess in the slide.

73. In a machine of the character described, hook-and-eye-assembling mechanism comprising an eye-holder, a single reciprocatory hook-placing arm having a lateral offset formed to engage a hook, and means for actuating said arm vertically and in a horizontal plane to cause it to engage a hook and shift it to carry the bill of the hook into the eye and detach the latter from its holder.

74. In a machine of the character described, hook-and-eye-assembling mechanism comprising an eye-holder, a single reciprocatory hook-placing arm having bosses to engage the thread-eyes of the hook, and means for actuating said arm to cause its bosses to engage said thread-eyes and to then shift the hook to carry its bill into the eye and detach the latter from its holder.

75. In a machine of the character described, hook-and-eye-assembling mechanism comprising an eye-holder, a single hook-placing arm having bosses to engage the thread-eyes of the hook, and means for reciprocating and vibrating said arm to cause its bosses to first engage said thread-eyes and then shift the hook to carry its bill into the eye and detach the latter from its holder.

76. In a machine of the character described, hook-and-eye-assembling mechanism comprising an eye-holder, a single hook-placing arm having a lateral portion provided with bosses to engage the thread-eyes of the hook, and means for reciprocating and vibrating said arm to cause its bosses to first engage said thread-eyes and then shift the hook to carry its bill into the eye and detach the latter from its holder.

77. In a machine of the character described, hook-and-eye-assembling mechanism comprising an eye-holder, a slide, means for reciprocating the slide, an arm pivotally connected with said slide and having a lateral portion provided with bosses to engage the thread-eyes of the hook, and means for vibrating said arm to cause said bosses to engage and release the hook.

78. In a machine of the character described, hook-and-eye-assembling mechanism comprising an eye-holder, a slide having a pin, a shaft having a cam-groove engaging said pin, an arm connected with the slide and provided with means to engage a hook whereby reciprocations of the slide will cause said arm to shift the hook to engage the bill of the latter with an eye and detach the latter from its holder, and means for intermittently rotating said shaft.

79. In a machine of the character described, hook-and-eye-assembling mechanism comprising an eye-holder, a slide and means for reciprocating it, an arm connected with said slide and formed to engage a hook and shift it past the eye-holder to cause the bill of the hook to engage the eye, and means for raising said arm after it reaches its forward position and holding it raised during its return movement.

80. In a machine of the character described, hook-and-eye-assembling mechanism comprising an eye-holder, a slide and means for reciprocating it, a lever having a forward portion formed to engage a hook and shift it past the eye-holder, a pin projecting from the lever, and a guide for said pin to cause the lever to oscillate when the slide is reciprocated.

81. In a machine of the character described, hook-and-eye-assembling mechanism comprising an eye-holder, a slide and means for reciprocating it, a lever having a forward portion formed to engage a hook and shift it past the eye-holder, a pin projecting from the lever, a fixed guide having a cam at each end, means whereby the pin will follow said fixed guide and cams during the advance movement of the lever and its pin, and means whereby said pin on its return movement will be held out of engagement with the fixed guide.

82. In a machine of the character described, hook-and-eye-assembling mechanism comprising an eye-holder, a slide and means for reciprocating it, a lever having a forward portion formed to engage a hook and shift it past the eye-holder, a pin projecting from the lever, a fixed guide having a cam at each end, a spring for causing said pin to bear against said guide, and a supplemental guide movable to and from the space between said cams, means being provided to cause the pin to ride between the fixed and movable guides when advancing and to return along the other side of the movable guide.

83. In a machine of the character described, hook-and-eye-assembling mechanism comprising an eye-holder, a slide and means for reciprocating it, a lever having a forward portion formed to engage a hook and shift it past the eye-holder, a pin projecting from the lever, a fixed guide having a cam at each end, a spring for pressing the pin toward said guide, a pivoted finger having a flange adapted to enter the space between said cams, and a spring connected with the finger to press its flange toward said fixed guide, said flange being formed to permit the entry and passage of the pin between it and said fixed guide when moving in one direction.

84. In a machine of the character described, hook-and-eye-assembling mechanism comprising an eye-holder, a slide and means for reciprocating it, a lever having a forward portion formed to engage a hook and shift it past the eye-holder, a pin projecting from the lever, a fixed guide having a cam at each end, a spring for pressing the pin toward said guide, a pivoted finger having a flange adapted to enter the space between said cams, and a spring connected with the finger to press its flange toward said fixed guide, said flange being formed to permit the entry and passage of the pin between it and said fixed guide when moving in one direction, a pin-and-slot connection being provided to limit the movement of the finger relatively to the fixed guide.

85. In a machine of the character described, hook-and-eye-assembling mechanism comprising an eye-holder, a slide and means for reciprocating it, a lever having a forward portion formed to engage a hook and shift it past the eye-holder, a pin projecting from the lever, a spring bearing on the lever to press the pin upward, a fixed guide 207 having cams 208 209 and a pin 214, a pivoted finger 210 having a flange 215 and formed with a slot 212 receiving the pin 214, and a spring 213 for normally pressing the slotted end of the finger upward.

86. In a machine of the character described comprising sewing mechanism, means for continuously feeding cards in succession and hook-and-eye supply and feed devices, a shaft having connections for controlling the placing of the hooks and eyes relatively to the cards, and means for intermittently driving said shaft.

87. In a machine of the character described comprising sewing mechanism, means for continuously feeding cards in succession and hook-and-eye supply and feed devices, a shaft having connections for controlling the placing of the hooks and eyes relatively to the cards, means including clutch members for driving the shaft, and means for automatically shifting said clutch.

88. In a machine of the character described comprising sewing mechanism, means for continuously feeding cards in succession and hookand-eye supply and feed devices, a shaft having connections for controlling the placing of the hooks and eyes relatively to the cards, means including clutch members for driving the shaft and cam-controlled devices for operating said clutch.

89. In a machine of the character described comprising sewing mechanism, means for continuously feeding cards in succession and hook-and-eye supply and feed devices, a shaft having connections for controlling the placing of the hooks and eyes relatively to the cards, means including clutch members for driving the shaft, the movable member of the clutch having a groove, a pivoted frame having a yoke engaging said groove, and means for actuating the said frame to shift the clutch members.

90. In a machine of the character described comprising sewing mechanism, means for continuously feeding cards in succession and hook-and-eye supply and feed devices, a shaft having connections for controlling the placing of the hooks and eyes relatively to the cards, means including clutch members for driving the shaft, the movable member of the clutch having a groove, a pivoted frame having a yoke engaging said groove, a counter-shaft having a cam-groove cylinder, the pivoted frame having an arm engaging said cam-groove, and connections whereby said counter-shaft will be continuously operated.

91. In a machine of the character described, a hook-hopper, means including a worm feed-screw for feeding hooks from said hopper, said screw having a worm at one end, a shaft having a worm-wheel engaging the worm of the feed-screw, and means for intermittently actuating said shaft.

92. In a machine of the character described, a hook-hopper, means including a worm feed-screw for feeding hooks from said hopper, said screw having a worm at one end, a shaft having a notched disk and a worm-wheel, the latter engaging the worm of the feed-screw, and a driving-shaft having a disk provided with a tooth adapted to successively engage the recesses of the first-mentioned disk to impart a step-by-step movement to the feed-screw.

93. In a machine of the character described, the combination with the shaft 138 having a fixed pinion 235, of a gear loosely mounted on said shaft and formed to constitute one member of a clutch, a counter-shaft having a gear 234 meshing with the pinion 235, a cam secured to said counter-shaft, a clutch member splined on the first-mentioned shaft and adapted to coöperate with the first-mentioned clutch member, hook-and-eye-feed devices having connections whereby they are operated by the first-mentioned shaft, means for continuously driving the gear that is loose on the first-mentioned shaft, and connections whereby the clutch is controlled by the cam on the counter-shaft.

In testimony whereof I affix my signature in presence of two witnesses.

ALEXANDER RAINERT.

Witnesses:
JOS. MEYERSON,
S. SANDERS NECK.